(12) United States Patent
Bakshi et al.

(10) Patent No.: US 11,902,236 B2
(45) Date of Patent: Feb. 13, 2024

(54) CONTEXT-BASED NOTIFICATIONS PRESENTATION

(71) Applicant: Salesforce, Inc., San Francisco, CA (US)

(72) Inventors: Akshay Bakshi, Vancouver (CA); Scott Buchanan, Vancouver (CA); Mina Chandler, Suwanee, GA (US); Gavin Ham, Vancouver (CA); Justin Rushing, Oakland, CA (US); Leena Mansour, Toronto (CA); Faisal Yaqub, New York, NY (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 17/446,111

(22) Filed: Aug. 26, 2021

(65) Prior Publication Data

US 2023/0049885 A1   Feb. 16, 2023

Related U.S. Application Data

(63) Continuation of application No. 17/403,714, filed on Aug. 16, 2021, now Pat. No. 11,736,431.

(51) Int. Cl.
*H04L 12/28* (2006.01)
*H04L 51/226* (2022.01)
(Continued)

(52) U.S. Cl.
CPC .......... *H04L 51/226* (2022.05); *H04L 51/222* (2022.05); *H04L 51/224* (2022.05);
(Continued)

(58) Field of Classification Search
CPC ............... H04L 51/226; H04L 51/222; H04M 1/72451; H04M 1/72454
See application file for complete search history.

(56) References Cited

U.S. PATENT DOCUMENTS 7,360,202 B1 * 4/2008 Seshadri ............ H04L 12/1859
717/106
9,473,428 B1   10/2016 Koum et al.
(Continued)

OTHER PUBLICATIONS

U.S. Appl. No. 16/993,859, filed Aug. 14, 2020, Butterfield, et al., "Electronic Board Associated With a Communication Platform", 45 pages.
(Continued)

*Primary Examiner* — Chi H Pham
*Assistant Examiner* — Elisabeth Benoit Magloire
(74) *Attorney, Agent, or Firm* — Lee & Hayes, P.C.

(57) ABSTRACT

The present disclosure is related to automatically, based on contextual information and without needing explicit input from a user, modifying one or more settings associated with presenting a notification. In examples, settings may include automatically suspending notification presentation or automatically overriding a notification setting that suspends notification presentation. In addition, contextual information may include, among other things, information related to a computing device (e.g., device location or network signal strength), a rate of user interaction or engagement with an application (e.g., rate of information sharing, user reactions, etc.), and/or a calendar or schedule of a user. In examples, the contextual information may be analyzed (e.g., based on comparison to a threshold) to determine whether a condition is met, and based on the analysis, the one or more settings may be modified.

20 Claims, 7 Drawing Sheets

(51) Int. Cl.

| | |
|---|---|
| *H04M 1/72454* | (2021.01) |
| *H04M 1/72451* | (2021.01) |
| *H04M 1/72457* | (2021.01) |
| *H04L 51/222* | (2022.01) |
| *H04L 51/224* | (2022.01) |
| *H04W 72/563* | (2023.01) |
| *H04W 72/54* | (2023.01) |
| *H04W 4/02* | (2018.01) |
| *H04W 68/02* | (2009.01) |
| *H04M 1/72463* | (2021.01) |

(52) U.S. Cl.
CPC ... *H04M 1/72451* (2021.01); *H04M 1/72454* (2021.01); *H04M 1/72457* (2021.01); *H04W 4/025* (2013.01); *H04W 68/02* (2013.01); *H04W 72/54* (2023.01); *H04W 72/563* (2023.01); *H04M 1/724631* (2022.02)

(56) References Cited

U.S. PATENT DOCUMENTS

| | | | |
|---|---|---|---|
| 10,051,107 B1* | 8/2018 | Prasad | H04L 67/535 |
| 10,084,732 B1 | 9/2018 | Smarr et al. | |
| 10,462,624 B1 | 10/2019 | Aijazi et al. | |
| 10,680,981 B2 | 6/2020 | Tian et al. | |
| 11,265,277 B2* | 3/2022 | Yegorin | G06Q 50/01 |
| 2012/0192086 A1* | 7/2012 | Ghods | H04L 12/1813 715/753 |
| 2014/0082093 A1* | 3/2014 | Savage | H04L 41/50 709/206 |
| 2014/0172996 A1 | 6/2014 | Deeter et al. | |
| 2014/0179377 A1* | 6/2014 | Song | H04M 1/72403 455/566 |
| 2015/0295878 A1* | 10/2015 | Bender | H04L 51/224 709/206 |
| 2016/0231122 A1 | 8/2016 | Beaurepaire | |
| 2017/0289073 A1* | 10/2017 | Crusson | G06F 3/0482 |
| 2018/0063061 A1 | 3/2018 | Tian et al. | |
| 2018/0069815 A1 | 3/2018 | Fontana et al. | |
| 2018/0189343 A1* | 7/2018 | Embiricos | G06F 16/2358 |
| 2018/0191852 A1* | 7/2018 | Brunn | H04L 51/52 |
| 2018/0248829 A1 | 8/2018 | Hardee et al. | |
| 2018/0287982 A1 | 10/2018 | Draeger et al. | |
| 2018/0308180 A1 | 10/2018 | Bar et al. | |
| 2019/0188604 A1 | 6/2019 | Amitava et al. | |
| 2020/0036451 A1 | 1/2020 | Gilson | |
| 2020/0106735 A1 | 4/2020 | Guerrieri et al. | |
| 2020/0259948 A1 | 8/2020 | Keohane et al. | |
| 2020/0412564 A1* | 12/2020 | Roedel | H04L 12/1818 |
| 2021/0234827 A1* | 7/2021 | Waldman | G06Q 10/1097 |
| 2023/0048072 A1 | 2/2023 | Bakshi et al. | |

OTHER PUBLICATIONS

U.S. Appl. No. 17/111,408, filed Dec. 3, 2020, Khosrowshahi, "Integrating a Third-Party Platform Into a Communication Platform", 53 pages.

U.S. Appl. No. 17/163,017, filed Jan. 29, 2021, McCue, et al., "Utilizing Message Metadata for Improving User Interface Presentation", 72 pages.

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

Office Action for U.S. Appl. No. 17/403,714, dated Aug. 11, 2022, Bakshi, "Context-Based Notifications Presentation", 9 pages.

Office Action for U.S. Appl. No. 17/403,714, dated Feb. 3, 2023, Bakshi, "Context-Based Notifications Presentation" 10 pages.

* cited by examiner

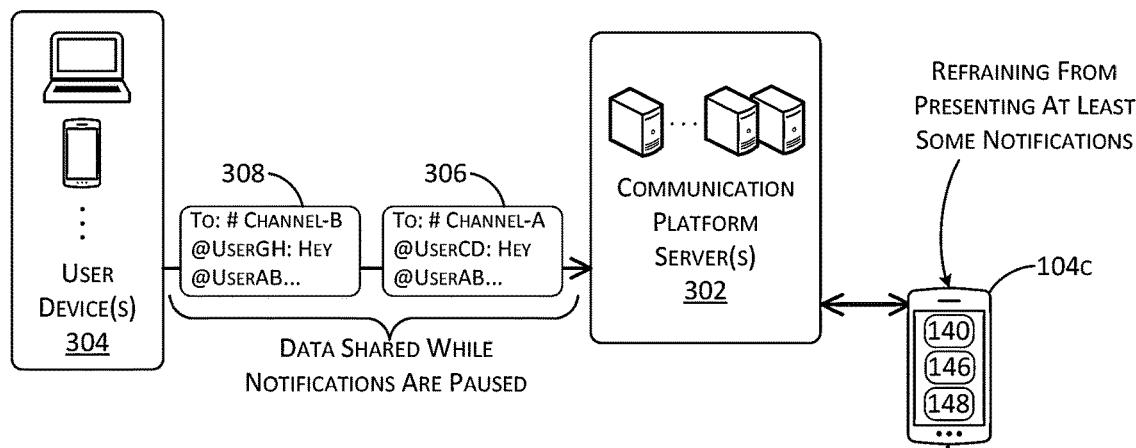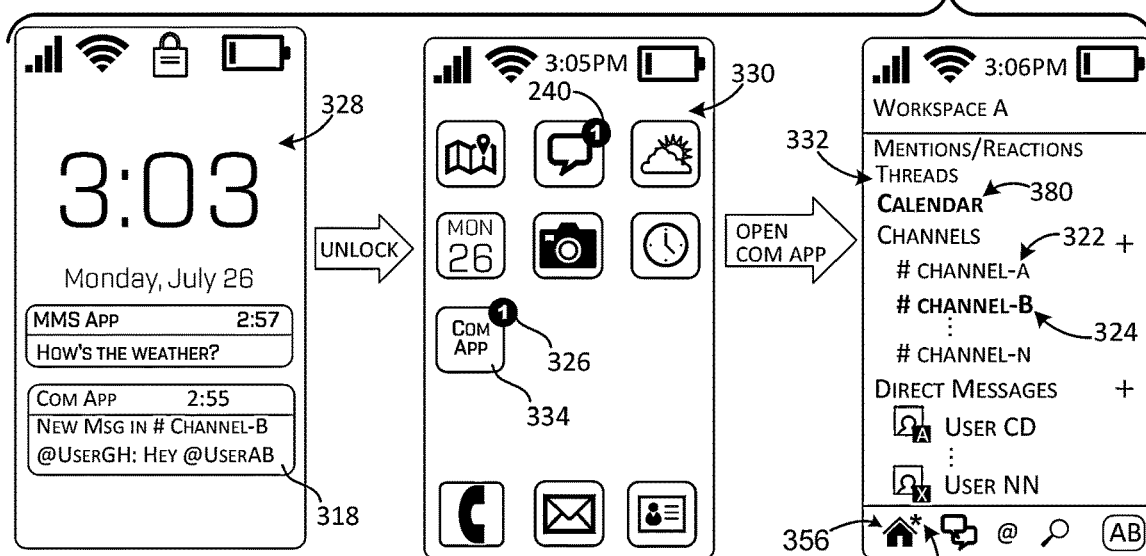
FIG. 3A
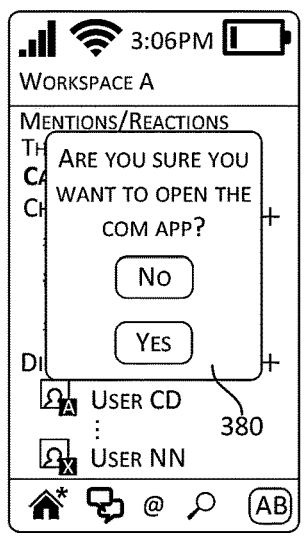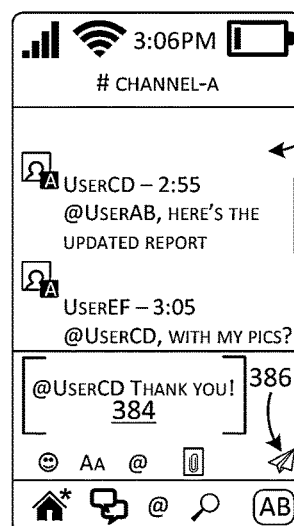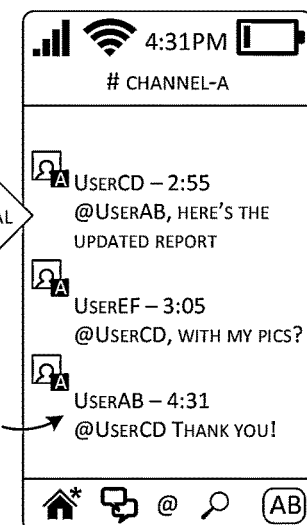
FIG. 3B FIG. 3C

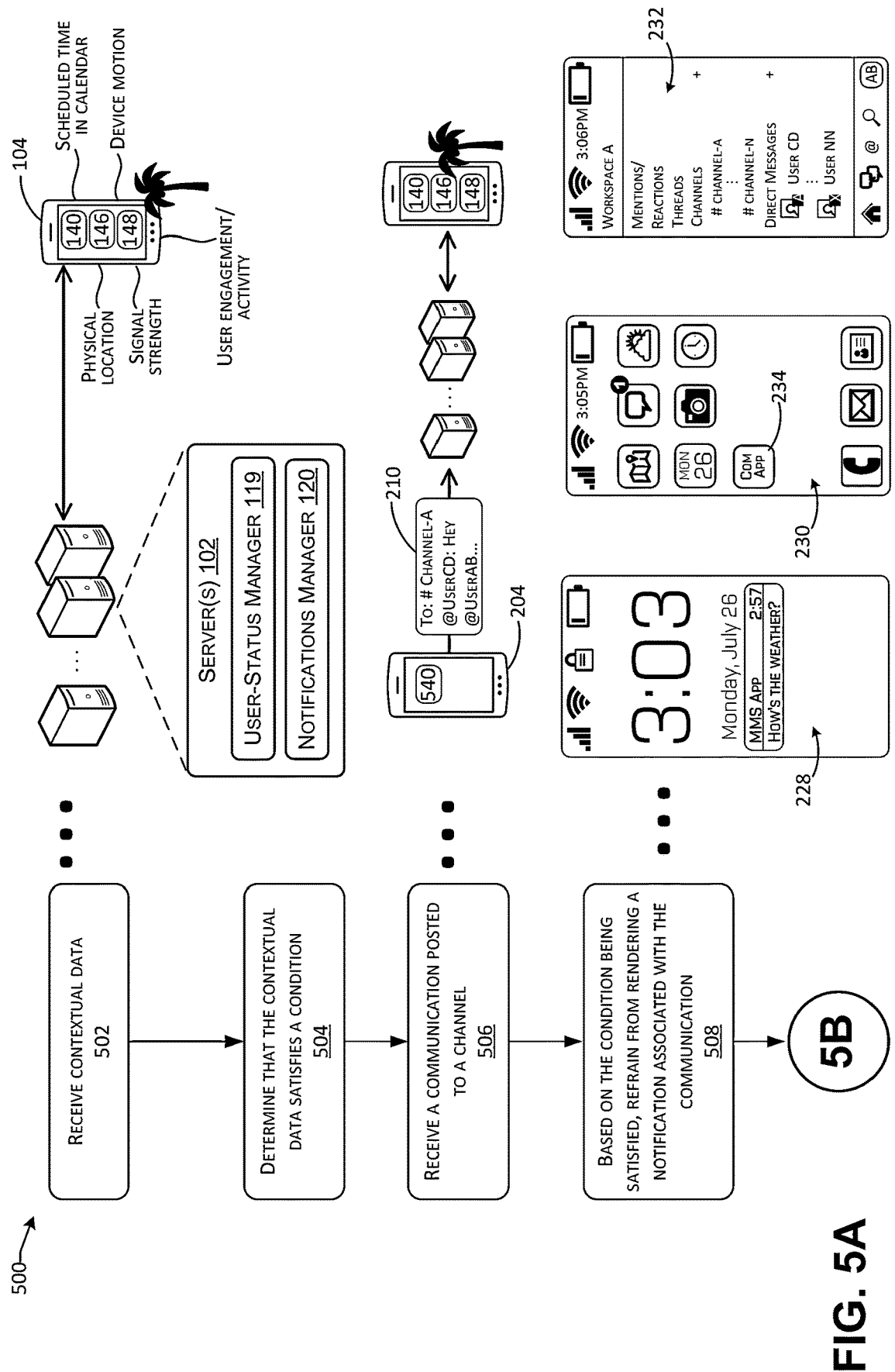

CONTEXT-BASED NOTIFICATIONS PRESENTATION

RELATED APPLICATIONS

This application is a continuation of, and claims priority to, U.S. patent application Ser. No. 17/403,714 filed Aug. 16, 2021 and entitled "Context-Based Notifications Presentation," the entire contents of which are incorporated herein by reference.

FIELD OF INVENTION

Computing applications often provide notifications to apprise a user of various alerts. For example, an application may provide notifications alerting a user that, among other things, a communication has been received, data has been shared, a task exists, or a meeting, event, or appointment is scheduled. In addition, notifications may take various forms. For example, notifications may be graphically, audibly, and/or haptically presented while a computing device is in various states. Examples of some states may include a locked state (e.g., when a computing device is in a sleep mode, presenting a lock screen user interface, etc.), a home screen state (e.g., when a computing device is presenting a list of one or more applications executable using the computing device), an application state (e.g., when an application is open on the computing device), and the like. In some instances, a user may specify preferences associated with notification presentation. For example, a user may specify a user status (e.g., "do not disturb" or "vacation"), which may suspend or delay notification presentation. In addition, a user may specify a notifications schedule, which may specify a first time during which notifications are presented and a second time during which notification presentation is suspended.

However, in some instances, user-specifiable settings may not result in notifications being presented in preferred manners. For example, when a user fails to specify a status that would otherwise suspend notification presentation, notifications may still be presented in a manner that is distracting, unwanted, or ineffective. In other examples, a user may specify a setting that suspends presentation of all notifications; however, the suspension of notification presentation may result in a user missing time-sensitive, or otherwise important, notifications. In these instances, notification presentation may contribute to, among other things, inefficient use of computing resources, user frustration with (and potential abandoning of) an application, a user missing notifications, and other undesirable consequences.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3A-3C illustrates a user computing device with interfaces for presenting notifications, confirming a request to open as described herein.

FIG. 3B illustrates an interface for confirming a request to open an application, as described herein.

FIG. 3C illustrates interfaces for inputting a message and delayed posting of the message, as described herein.

FIGS. 5A and 5B include a flow diagram illustrating an example process for managing notification presentation based on contextual data, as described herein.

DETAILED DESCRIPTION

Figure 1:
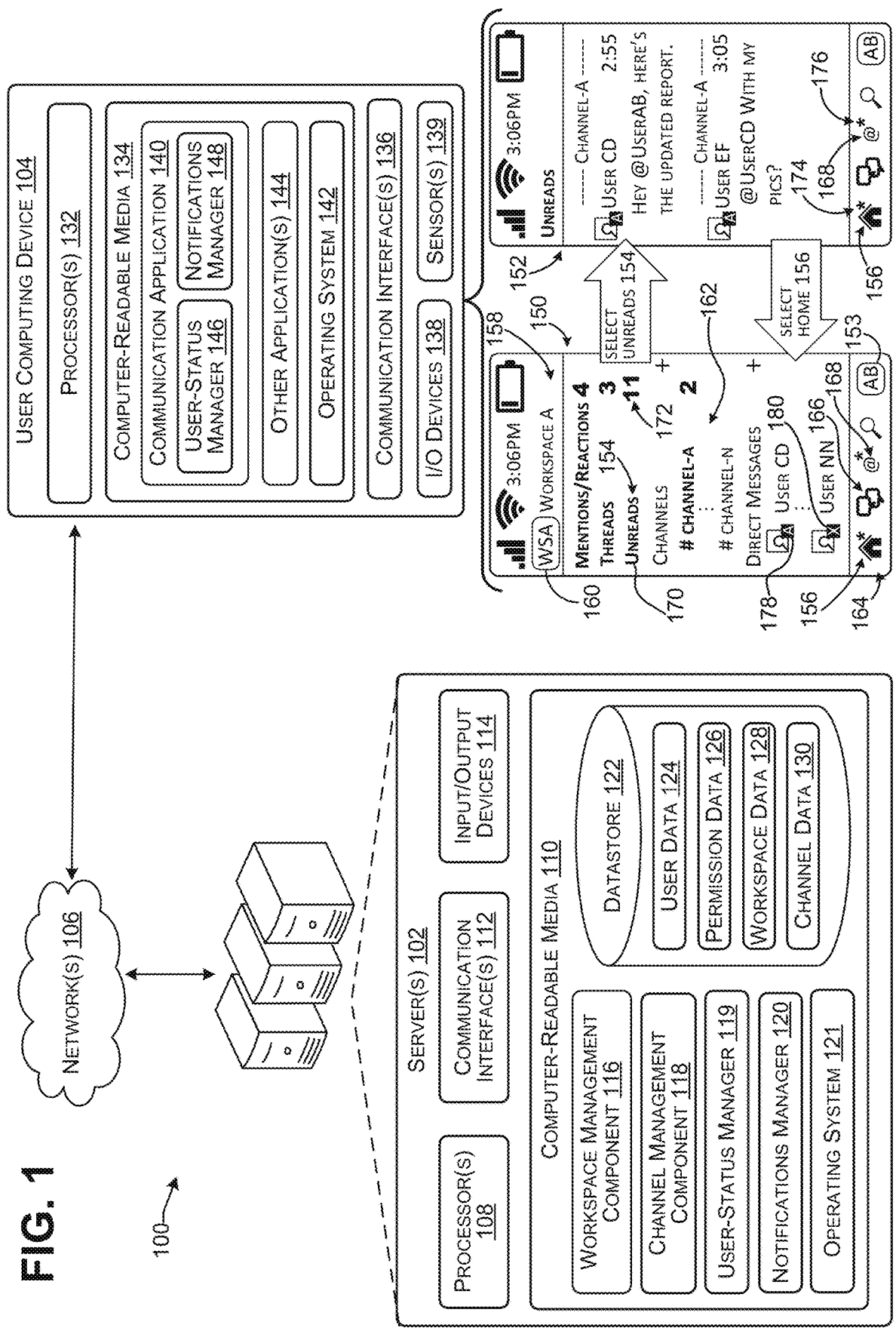
FIG. 1 illustrates a block diagram depicting an example system of computing devices usable to implement example techniques described herein.

As discussed above, a computing application may provide various types of notifications. The present disclosure is related to automatically, based on contextual information and without needing explicit input from a user, modifying one or more settings associated with notification presentation. According to the present disclosure, examples of modifying one or more settings based on contextual information may include automatically suspending notification presentation or automatically overriding a notification setting that suspends notification presentation. In addition, examples of modifying one or more settings may include automatically prioritizing a presentation of notifications when the notifications are presented (e.g., when a notification suspension period expires). In some non-limiting examples, contextual information may include, among other things, information related to a computing device (e.g., device location or wireless signal strength), a rate of user interaction or engagement with an application (e.g., rate of information sharing, user reactions, etc.), information from external applications, or a calendar or schedule of a user. In examples, the contextual information may be analyzed (e.g., based on comparison to a threshold) to determine whether a condition is met, and based on the analysis, the one or more settings may be modified.

In examples of this disclosure, notifications that are associated with an application (e.g., group-based communication application) may be generated under various circumstances. For example, in a group-based communication application, multiple users may have access to data (e.g., messages, files, and other content) shared or posted to a virtual space (e.g., channel or thread), and a notification may be generated when data is shared to alert one or more of the users of the posting. In some instances, notifications may be generated and presented (e.g., graphically, audibly, and/or haptically) when data is shared with users having access to the virtual space. For example, notifications may be presented on a lock screen, presented among a compiled list of notifications, presented as a banner or pop-up, and/or presented within an application (e.g., as a badge, bolded text, an incremented counter, etc.). However, under some circumstances it may be preferable to control when notifications are presented, such as by refraining from presenting notifications until a context changes. For example, if a virtual space is associated with work-related content, it may be preferable to refrain from presenting notifications under some contexts (e.g., when a user is not at work, at home, on vacation, sick, commuting, focusing on a task, in a meeting, at an appointment, a current time is associated with non-working hours, or the user is otherwise in a state not associated with work), until the context changes. Vice versa, if a virtual space is associated with social-related content, it may be less preferable to present related notifications when a user is at work (e.g., at a physical location associate with work, in working hours, interacting with work-related computing applications, etc.), and instead, wait to present notifications until a different context. Otherwise, presenting notifications under non-preferred circumstances may increase the likelihood that the notification will not accomplish intended purposes and/or will have undesirable effects. For instance, the notifications may be ignored, not perceived, and/or distracting, which may unnecessarily waste computing resources. In addition, ineffective notifications may prompt a user to permanently block all notifications (e.g., even notifications that would be helpful) and/or delete the application associated with the notifications.

In examples of the present disclosure, a presentation of a notification is delayed or suspended (e.g., temporarily) based on contextual data and without needing explicit input from a user. That is, presentation of a notification may be suspended based on contextual data without needing a user to change or update a user setting. Examples of contextual data may include, among other things, data associated with a user computing device (e.g., physical location data, power state, network strength, airplane mode, etc.), data associated with one or more applications being executed via the user computing device (e.g., a group-based communication application, a calendar or scheduling application, a document creation and management application, etc.), data suggesting a level of engagement and/or interaction with one or more virtual spaces; and the like.

Contextual data may be used in various ways to determine when to refrain from presenting a notification. For example, contextual data may be compared to a rule, threshold, condition, etc., to determine whether the contextual data suggests it may be useful to refrain from presenting a notification. In addition, the manner in which contextual data is analyzed may depend on the type of contextual data and how it is being used to draw inferences.

At least some examples of the present disclosure may include refraining from presenting a notification based on location data associated with a user computing device. For example, location data may include global positioning system (GPS) data or cell triangulation data indicating a physical location of the user computing device. In some examples, notification presentation may be suspended based on whether the physical location is included among, or is a threshold distance from, one or more other locations (e.g., a workplace, a home or residence, etc.). In examples, other data associated with the user computing device may also provide a basis to suspend notification presentation. For example, some data may indicate a user computing device is in motion (e.g. data from a sensor, a change in physical location over time, etc.), and as such, notification presentation may be suspended when the motion satisfies a threshold (e.g., speed, distance, etc.). In other examples, a signal strength associated with a network (e.g., cellular network, Wi-Fi, etc.) may be compared to a threshold to determine when to refrain from presenting notifications (e.g., when the user computing device is not connected to a network, when the signal strength is relatively weak, when the user computing device is in a roaming state and/or an extended network state, etc.).

At least some examples of the present disclosure may include refraining from presenting a notification based on data associated with a calendar application or scheduling application. For example, data associated with a calendar application may indicate a variety of scheduled times, including working hours, non-working hours, appointment times, meeting times, vacation time, and the like. As such, notification presentation may be suspended if a time associated with a notification (e.g., when data is shared and triggers the notification) is within a threshold time duration of a scheduled time.

At least some examples of the present disclosure may include refraining from presenting notifications based on data suggesting a level of user engagement with the communication application. For example, data may indicate a rate at which users are sharing data, scheduling meetings, exchanging direct messages, reacting to posts, or otherwise using the communication application. In examples of the disclosure, notification presentation may be suspended when a rate of user engagement (e.g., quantity of engagement in a given time period) is below a threshold rate (e.g., threshold data-posting rate).

Among other things, temporarily delaying notification presentation (e.g., until contextual data changes) may decrease the likelihood that the notification will be presented in a distracting manner, will be ignored, and/or will undesirably displace (or otherwise detract from) other notifications (e.g., on a display screen). In these respects, temporarily delaying notification presentation may more efficiently utilize computing resources (e.g., viewable area of a display screen) and may contribute to a better user experience.

As indicated above, notifications that are associated with an application (e.g., group-based communication application) may be generated under various circumstances, such as when data is shared among users of a group-based communication platform. In some instances, a user may change a setting associated with notification presentation, such that notification presentation is suspended (e.g., temporarily). For example, a user status may be set to "do not disturb" or "vacation" (or some other status that suspends notification presentation) and/or a user may have programmed a notifications schedule. In some examples, as explained above, notification presentation may be suspended based on contextual data, without needing a user to explicitly change a setting. However, suspending the presentation of all notifications may affect notifications associated with time-sensitive alerts and/or other notifications that would preferably be presented. Among other things, this delayed presentation of some notifications (e.g., time-sensitive and/or important) may contribute to a lesser user experience and/or may overwhelm the user and/or computing resources when all notifications are eventually presented.

At least some examples of the present disclosure include, based on contextual data and without needing explicit input from a user, presenting one or more first notifications while refraining from presenting one or more second notifications. For example, when a user status is set to "vacation" or a notifications schedule is presently set to pause notifications, it may still be preferable to receive some notifications (e.g., notifications associated with a very active virtual space or with time-sensitive schedule data). In a similar manner, when notification presentation has been automatically suspended, such as based on contextual data and potentially without explicit user input, it may be still be preferable to receive some notifications. As such, examples of the present disclosure may refrain from presenting some notifications and, based on contextual data and without needing explicit user input, present other notifications.

Various types of contextual data may be analyzed when determining when to present a notification that might otherwise be paused or suspended. In some examples, whether to present a notification may be based at least in part on a level of user engagement with a communication application. For example, data may indicate a rate at which users are sharing data, scheduling meetings, exchanging direct messages, reacting to posts, or otherwise using the communication application. In examples of the disclosure, a notification may be presented at least in part on the rate of user engagement (e.g., quantity of engagement in a given time period) being above a threshold rate (e.g., threshold data-posting rate).

At least some examples of the present disclosure may include presenting a notification based on data associated with a calendar application or scheduling application. For example, data associated with a calendar application may indicate that a meeting, appointment, or other scheduled time was previously not rejected or declined by a user. As such, even though a user status, notification schedule, and/or some contextual data may trigger suspension of notification presentation, a notification associated with the calendar application may still be presented based on the contextual data indicating the scheduled time was not rejected or declined.

Among other things, presenting some notifications, while temporarily suspending others (e.g., until contextual data changes), may decrease the likelihood that time-sensitive or other potentially important notifications will be missed or presented in an untimely manner. In addition, presenting some notifications before the notification suspension is lifted may decrease the likelihood that computing resources and/or the user will become overwhelmed once the delayed notifications are presented. Furthermore, when suspended notifications are eventually presented, a user may be better able to sort through, respond, and address the notifications, if potentially more important notifications have already been presented (prior to the pause being lifted).

In examples of the present disclosure, presentation of at least some notifications is temporarily suspended, and expiration of the suspension period (e.g., when the suspended notifications are then presented) may be determined in various manners. For example, in some instances, additional contextual data is received and analyzed to determine whether a condition is still met (e.g., based on comparing the additional contextual data to a threshold). In some examples, based on the additional contextual data, the one or more suspended notifications may be presented, such as when the condition that triggered the suspension is no longer satisfied and/or when a different condition is satisfied.

In at least some examples, once a suspension period has expired, notifications that were refrained from presentation may be presented in a prioritized manner. For example, contextual data associated with a first notification may be compared to contextual data associated with a second notification to rank the first and second notifications. Examples of contextual data that may be compared may include a level of activity on a respective channel, such as a level of activity by a subject user account and/or level of activity across the entire channel. Other examples of contextual data that may be compared to rank notifications for prioritized presentation may include a user account associated with each notification, such as whether a user account is identified as a "favorite" contact, "starred" contact, or other type of higher significance identifier. In at least some examples, a first notification that is ranked higher than a second notification may be presented with higher priority than the second notification (e.g., temporally prior, prior in a listing, etc.).

In some examples, during a suspension period in which notification presentation is paused, a group of paused notifications (e.g., notifications that were refrained from presentation) may be generated. In at least some examples of this disclosure, a subset of the paused notifications may be, based at least in part on contextual data, selected from the larger group (e.g., notifications pertaining to items deemed to have higher importance). In addition, upon expiration of the presentation suspension period, the subset of selected notifications may be presented in a prioritized manner. For example, the subset of notifications may be presented separately from the larger group of paused notification. In some examples, the subset of notifications may be presented as a summarized brief of notifications that, based at least in part on the contextual data, are predicted to have higher relevance or importance. In at least some examples, the summarized brief of notifications may include a personalized list of tasks for the user to complete during a period of time. For example, the summarized brief of notifications may include a list of meetings, tasks, and/or other items for a user to take action on during a designated period of time (e.g., day, week, etc.). In some examples, the summarized brief of notifications may be generated based on a priority and may be presented regardless of whether a suspension period is in effect. In some examples, the summarized brief of notifications may be generated and presented daily. In some examples, the summarized brief of notifications may be generated and presented at a predetermined time that may overlap with a suspension period, based on the priority of the notifications in the summarized brief. In some examples, only the summarized brief of notifications may be presented during a suspension period.

In at least some examples, a high importance notification may be generated that, when presented, indicates to the user that high importance items (e.g., elevated items) were received during the suspension period. In some examples, the high importance notification may be determined based on metadata included in a message, such as an indication that a message is marked as "urgent," a mention (e.g., @mention) of the user in the message, or the like. In some examples, the notification may indicate that the elevated items and/or the brief are accessible via a link, such as when the elevated items have been compiled and stored in a folder or other data structure (e.g., possibly separate from other items not selected to be included among the high importance items).

In addition, in some examples, a timing of a presentation of the subset of selected notifications (and/or a notification alerting the user to the elevated items) may be selected to correspond with a time deemed most likely to effectively alert a user to the notifications. For example, the timing may correspond with the expiration of a suspension period. The expiration may be based on user input, such as when a notification suspension period is set to expire based on user-specified notifications schedule. In some examples, the expiration of the suspension period may be based on a change in contextual data, such as when location data changes (e.g., when a user location corresponds with a workplace) or when non-working hours change to working hours. In some examples, notifications that qualify to be in the summarized brief of notifications may be displayed despite a suspension period being in effect.

In some instances, the summarized brief (or other presentation of paused notification deemed to have higher relevance or importance) may be accessible and/or linked to a dedicated tab or page. In addition, the summarized brief may be presented as a pop-up interface. In some examples, the summarized brief may be presented as a message (e.g., from a bot account). In at least some examples, techniques may include presenting an elevated-items notification, such as on the lock screen and/or in an application (e.g., as a linked tab). In some instances, input of the elevated-items notification (or a link in the elevated-items notification) may cause a user computing device to navigate to a list or other compilation of the items selected as possibly having higher importance. In some instances, the summarized brief may be presented in a separate user interface for the corresponding notifications included in the summarized brief. In some instances, the summarized brief is presented together with other notifications. In some instances, summarized brief notifications are denoted differently to indicate they are associated with the summarized brief. In some instances, the summarized brief includes tasks, meetings, and priority events (e.g., deals, tickets, requests) that a user may take an action on. In some instances, these actions, calendar items, tasks, or associated data or messages may be associated and/or displayed in the notifications in the summarized brief.

Relevance or importance of notifications paused during a suspension period may be determined based on various criteria. For example, based at least in part on contextual data, the notifications (or the item(s) that triggered the notification) may be predicted to be related to a time-sensitive item (e.g., calendar item, meeting, appointment, task, etc.); an important or relevant topic; an important or relevant person; a channel, thread, or communications feed that is highly active; and the like. The subset of notifications that is selected for prioritized presentation may be based on various types and/or sources of contextual data. For example, in some techniques of the present disclosure, the subset of notifications may be selected based on a level of user engagement across a channel, thread, or communications feed (e.g., a rate at which user of the channel are sharing data, reacting to posts, sending messages, etc.). In some examples, the subset of notifications may be presented as part of a first application (e.g., a communications application of a communications platform) and may be selected based on data provided by a second application (e.g., a third-party application, such as a calendar application, from which the communications platform retrieves data via a data application programming interface (API)). In at least some examples, the subset of notifications may be selected based on tasks that are created by a first user account and that are assigned for execution to a second user account.

Though described herein as primarily being presented after a suspension period, this is not intended to be so limiting, and a summarized brief of notifications may be presented to a user at another time of day unrelated to a suspension period. In some examples, the user may set, as a user preference, a time (e.g., morning, upon first user log in) associated with the summarized brief of notifications. As such, the user may designate the particular day, time, etc. for the communication platform to surface the summarized brief of notifications. In other words, the user can establish characteristics for the summarized brief of notifications, such as frequency, information included, and the like. For example, a user may set a user preference to receive the summarized brief of notifications at 10 am on weekdays. Based on the user preference, the communication platform may identify one or more tasks for the user to take action on during the day, such as meetings, messages to respond to, information to be disseminated, daily, weekly, and/or quarterly check-ins with customers, and/or the like, and may cause a presentation of the task(s) on a user device of the user at 10 am each weekday.

These and other aspects are described further below with reference to the accompanying drawings. The drawings are merely example implementations and should not be construed to limit the scope of the claims. For example, while some examples are illustrated in the context of a user interface for a mobile device, the same or similar techniques may be implemented using any computing device and the user interface may be adapted to the size, shape, and configuration of the particular computing device.

FIG. 1 illustrates an example environment 100 for performing techniques described herein. In at least one example, the example environment 100 may be associated with a communication platform that may leverage a network-based computing system to enable users of the communication platform to exchange data. In at least one example, the communication platform may be "group-based" such that the platform, and associated systems, communication channels, messages, and/or virtual spaces, have security (that may be defined by permissions) to limit access to a defined group of users. In some examples, such groups of users may be defined by group identifiers, as described above, which may be associated with common access credentials, domains, or the like. In some examples, the communication platform may be a hub, offering a secure and private virtual space to enable users to chat, meet, call, collaborate, transfer files or other data, or otherwise communicate between or among each other. As described above, each group may be associated with a workspace, enabling users associated with the group to chat, meet, call, collaborate, transfer files or other data, or otherwise communicate between or among each other in a secure and private virtual space. In some examples, members of a group, and thus workspace, may be associated with a same organization. In some examples, members of a group, and thus workspace, may be associated with different organizations (e.g., entities with different organization identifiers).

In at least one example, the example environment 100 may include one or more server computing devices (or "server(s)") 102. In at least one example, the server(s) 102 may include one or more servers or other types of computing devices that may be embodied in any number of ways. For example, in the example of a server, the functional components and data may be implemented on a single server, a cluster of servers, a server farm or data center, a cloud-hosted computing service, a cloud-hosted storage service, and so forth, although other computer architectures may additionally or alternatively be used.

In at least one example, the server(s) 102 may communicate with a user computing device 104 via one or more network(s) 106. That is, the server(s) 102 and the user computing device 104 may transmit, receive, and/or store data (e.g., content, information, or the like) using the network(s) 106, as described herein. The user computing device 104 may be any suitable type of computing device, e.g., portable, semi-portable, semi-stationary, or stationary. Some examples of the user computing device 104 may include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 may include multiple (e.g., tens of, hundreds of, thousands of, millions of) user computing devices. In at least one example, user computing devices, such as the user computing device 104, may be operable by users to, among other things, access communication services via the communication platform. A user may be an individual, a group of individuals, an employer, an enterprise, an organization, or the like.

The network(s) 106 may include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications may depend at least in part upon the type of network, the environment selected, or both. Protocols for communicating over such network(s) 106 are well known and are not discussed herein in detail.

In at least one example, the server(s) 102 may include one or more processors 108, computer-readable media 110, one or more communication interfaces 112, and input/output devices 114.

In at least one example, each processor of the processor(s) 108 may be a single processing unit or multiple processing units and may include single or multiple computing units or multiple processing cores. The processor(s) 108 may be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 may be one or more hardware processors and/or logic circuits of any suitable type specifically programmed or configured to execute the algorithms and processes described herein. The processor(s) 108 may be configured to fetch and execute computer-readable instructions stored in the computer-readable media, which may program the processor(s) to perform the functions described herein.

The computer-readable media 110 may include volatile and nonvolatile memory and/or removable and non-removable media implemented in any type of technology for storage of data, such as computer-readable instructions, data structures, program modules, or other data. Such computer-readable media 110 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that may be used to store the desired data and that may be accessed by a computing device. Depending on the configuration of the server(s) 102, the computer-readable media 110 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 110 may be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102.

Functional components stored in the computer-readable media may optionally include a workspace management component 116, a channel management component 118, user-status manager 119, a notifications manager 120, an operating system 121, and a datastore 122.

In at least one example, the workspace management component 116 may manage workspaces. That is, in at least one example, the communication platform may be partitioned into different workspaces, which may be associated with different groups of users, as described above. As described above, each workspace may be associated with a group identifier and one or more user accounts may be mapped to, or otherwise associated with, the group identifier. User(s) corresponding to such user account(s) may be "members" of the group.

In some examples, the workspace management component 116 may manage workspace membership. That is, the workspace management component 116 may receive requests to associate users with individual workspaces and the workspace management component 116 may associate user accounts associated with such users with group identifiers associated with the individual workspaces. For example, responsive to receiving a request to add a user to a workspace, the workspace management component 116 may associate a user account of the user with a group identifier of the workspace. The workspace management component 116 may disassociate user accounts and group identifiers, for example, when a user is removed from a workspace.

In at least one example, the channel management component 118 may manage communication channels. As described above, in at least one example, the communication platform may be a channel-based messaging platform, that in some examples, may be usable by group(s) of users. Users of the communication platform may communicate with other users via communication channels. A communication channel, or virtual space, may be a data route used for exchanging data between and among systems and devices associated with the communication platform. In at least one example, the channel management component 118 may establish a communication channel between and among various user computing devices, allowing the user computing devices to communicate and share data between and among each other. In at least one example, the channel management component 118 may manage such communications and/or sharing of data. In some examples, data associated with a communication channel may be presented via a user interface. In at least one example, the channel management component 118 may interact with the workspace management component 116 to manage the generation, presentation, and/or updating of user interfaces. Additional details of operations that may be performed by the channel management component 118 are described below.

In at least one example, the user-status manager 119 may monitor, determine, and/or update a status associated with a user (e.g., with a user computing device and/or with an application usable to share data using the communication platform). For example, a status may include various designations, such, but not limited to, "active," "away," "do not disturb (DND)," "working remotely," "in a meeting," "focus mode," "vacation," "commuting," "out sick," etc. A user status may, in some examples, be explicitly designated, via the user computing device 104, such as when a user manually sets a status in a user profile. In some examples, the user-status manager 119 may infer or determine a user status based on contextual information associated with various elements, such as the user computing device 104 (e.g., physical location data, power state, network strength, airplane mode, etc.); one or more applications being executed via the computing device 104 (e.g., a client application of the communication platform, a calendar or scheduling application, a document creation and management application, etc.); engagement and/or interaction associated with one or more channels; and the like. For example, the user-status manager 119 may compare contextual data to a rule, threshold, condition, etc. to determine whether the contextual data indicates a user status might apply and update the status accordingly.

In at least one example, the notifications manager 120 may generate and provide, to the user computing device 104, one or more notifications (e.g., for alerting a user) to be presented by the user computing device 104. For example, notifications may indicate to a user a scheduled event and/or that data (e.g., message(s), communication(s), document(s), reaction(s), etc.), to which a user has access, has been shared. Notifications may include notifications presented via interface of an application (e.g., in a sidebar, menu, tabs, etc.), notifications presented via a notifications application programming interface (API) of the user computing device (e.g., when the computer is in a locked state, pop-up banner in a notifications bar and/or on a home screen, etc.), or any combination thereof. In some examples, operations of the notifications manager 120 (e.g., when to provide notifications) may depend on a user status. For example, when a user status is designated as "active," the notifications manager 120 may provide notifications, and in some examples, when the user status is designated as "vacation" or "focus mode" or something similar, the notifications manager may refrain from providing notifications. In at least one example, the notifications manager 120 may, based on contextual data and without needing explicit input from a user, refrain from presenting a notification. In at least one example, the notifications manager 120 may, based on contextual data and without needing explicit input from a user, present at least one notification while refraining from presenting at least one or more other notifications.

In at least one example, the operating system 121 may manage the processor(s) 108, computer-readable media 110, hardware, software, etc. of the server(s) 102.

In at least one example, the datastore 122 may be configured to store data that is accessible, manageable, and updatable. In some examples, the datastore 122 may be integrated with the server(s) 102, as shown in FIG. 1. In other examples, the datastore 122 may be located remotely from the server(s) 102 and may be accessible to the server(s) 102 and/or user device(s), such as the user device 104. The datastore 122 may comprise multiple databases, which may include user data 124, permission data 126, workspace data 128, and channel data 130. Additional or alternative data may be stored in the data store and/or one or more other data stores.

In at least one example, the user data 124 may store data associated with users of the communication platform. In at least one example, the user data 124 may store data in user profiles (which may also be referred to as "user accounts"), which may store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status (e.g., user status as described above with respect to the user-status manager 119), a token, and the like.

In at least one example, the permission data 126 may store data associated with permissions of individual users of the communication platform. In some examples, permissions may be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user may be mapped to, or otherwise associated with, an account or profile associated with the user data 124. In some examples, permissions may indicate which users may communicate directly with other users, which channels a user is permitted to access, restrictions on individual channels, which workspaces the user is permitted to access, restrictions on individual workspaces, and the like. In at least one example, the permissions may support the communication platform by maintaining security for limiting access to a defined group of users. In some examples, such users may be defined by common access credentials, group identifiers, or the like, as described above.

In at least one example, the workspace data 128 may store data associated with individual workspaces. As described above, the communication platform may be partitioned into workspaces associated with groups of users. In at least one example, a group identifier may be associated with a workspace. In at least one example, the group identifier may indicate a physical address in the workspace data 128 where data related to the corresponding workspace is stored. In at least one example, data associated with workspace permissions may be stored in association with the group identifier, data identifying users associated with the workspace may be stored in association with the group identifier, data associated with messages and/or other content associated with the workspace may be stored in association with the group identifier, data associated with communication channels associated with the workspace may be stored in association with the group identifier, and the like. In some examples, workspaces may be associated with one or more organization identifiers, which may be associated with organizations or other entities associated with the communication platform. In some examples, such data may be mapped to, or otherwise associated with, other types of data in the datastore 122 (e.g., the user data 124, the permission data 126, the channel data 130, etc.).

In at least one example, the channel data 130 may store data associated with individual communication channels. In at least one example, the channel management component 118 may establish a communication channel between and among various user computing devices, allowing the user computing devices to communicate and share data between and among each other. In at least one example, a communication channel identification may be assigned to a communication channel, which indicates the physical address in the channel data 130 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations.

In some examples, the datastore 122 may be partitioned into discrete items of data that may be accessed and managed individually (e.g., data shards). Data shards may simplify many technical tasks, such as data retention, unfurling (e.g., detecting that message contents include a link, crawling the link's metadata, and determining a uniform summary of the metadata), and integration settings. In some examples, data shards may be associated with organizations, groups (e.g., workspaces), communication channels, users, or the like.

In some examples, individual organizations may be associated with a database shard within the datastore 122 that stores data related to a particular organization identification. For example, a database shard may store electronic communication data associated with members of a particular organization, which enables members of that particular organization to communicate and exchange data with other members of the same organization in real time or near-real time. In this example, the organization itself may be the owner of the database shard and has control over where and how the related data is stored. In some examples, a database shard may store data related to two or more organizations (e.g., as in a shared channel).

In some examples, individual groups may be associated with a database shard within the datastore 122 that stores data related to a particular group identification (e.g., workspace). For example, a database shard may store electronic communication data associated with members of a particular group, which enables members of that particular group to communicate and exchange data with other members of the same group in real time or near-real time. In this example, the group itself may be the owner of the database shard and has control over where and how the related data is stored.

In some examples, a communication channel may be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization may be the owner of the database shard and may control where and how the related data is stored.

In some examples, individual users may be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself may be the owner of the database shard and has control over where and how the related data is stored.

The communication interface(s) 112 may include one or more interfaces and hardware components for enabling communication with various other devices (e.g., the user computing device 104), such as over the network(s) 106 or directly. In some examples, the communication interface(s) 112 may facilitate communication via Websockets, Application Programming Interfaces (APIs) (e.g., using API calls), HyperText Transfer Protocols (HTTPs), etc.

The server(s) 102 may further be equipped with various input/output devices 114 (e.g., I/O devices). Such I/O devices 114 may include a display, various user interface controls (e.g., buttons, joystick, keyboard, mouse, touch screen, etc.), audio speakers, connection ports and so forth.

In at least one example, the user computing device 104 may include one or more processors 132, computer-readable media 134, one or more communication interfaces 136, input/output devices 138 (I/O devices), and one or more sensor(s) 139 (which may be a type of input device). Examples of sensors may include motion sensors (e.g., accelerometer, gyroscope, magnetometer, inertial measurement unit (IMU), etc.); location sensors (e.g., Global Positioning System (GPS) sensor); etc.

In at least one example, each processor of the processor(s) 132 may be a single processing unit or multiple processing units, and may include single or multiple computing units or multiple processing cores. The processor(s) 132 may comprise any of the types of processors described above with reference to the processor(s) 108 and may be the same as or different than the processor(s) 108.

The computer-readable media 134 may comprise any of the types of computer-readable media 134 described above with reference to the computer-readable media 110 and may be the same as or different than the computer-readable media 110. Functional components stored in the computer-readable media may optionally include a communication application 140 (e.g., for interacting with the server(s) 102); an operating system 142; and one or more other application(s) 144 (e.g., calendar application or other time management or scheduling application).

In at least one example, the communication application 140 may be a mobile application, a web application, or a desktop application, which may be provided by the communication platform or which may be an otherwise dedicated application. In some examples, individual user computing devices associated with the environment 100 may have an instance or versioned instance of the communication application 140, which may be downloaded from an application store, accessible via the Internet, or otherwise executable by the processor(s) 132 to perform operations as described herein. That is, the communication application 140 may be an access point, enabling the user computing device 104 to interact with the server(s) 102 to access and/or use communication services available via the communication platform. In at least one example, the communication application 140 may facilitate the exchange of data between and among various other user computing devices, for example via the server(s) 102. In at least one example, the communication application 140 may present user interfaces, as described herein. In at least one example, a user may interact with the user interfaces via touch input, keyboard input, mouse input, spoken input, or any other type of input.

The communication application 140 may include various functional components, and in at least one example, the application 140 includes a user-status manager 146 and a notifications manager 148. In some examples, the user-status manager 146 may perform one or more operations that are similar to the user-status manager 119 and that may monitor, determine, and/or update a user status. For example, the user-status manager 146 may monitor and store a user status as explicitly or manually designated via the user computing device 104 (e.g., by a user interacting with the user computing device 104). In at least some examples, the user-status manager 146 may determine a user status based on contextual information without the need for user explicit input. In some examples, the user-status manager 146 on the user computing device 104 may exchange user-status designations or determinations with the user-status manager 119 on the server(s) 102. For example, the user-status manager 146 may determine a user-status designation, which is provided to the user-status manager 119, and vice versa.

In some examples the notifications manager 148 may perform one or more operations that are similar to the notifications manager 120. For example, the notifications manager 148 may generate and/or provide, to other components of the user computing device 104, one or more notifications to be presented. For example, notifications may indicate that data (e.g., message(s), communication(s), document(s), reaction(s), etc.) has been shared with the user account and/or a user status. In at least one example, the notifications manager 148 may, based on contextual data and without needing explicit input from a user, refrain from presenting a notification. In at least one example, the notifications manager 148 may, based on contextual data and without needing explicit input from a user, present at least one notification while refraining from presenting at least one or more other notifications.

A non-limiting example of user interfaces 150 and 152 are shown in FIG. 1, and the user interfaces 150 and 152 may present data and information associated with a user account (e.g., "UserAB"), which is associated with the user profile indicator 153 depicted as "AB." In some examples, the user computing device 104 may navigate between the user interfaces 150 and 152. For example, the user computing device 104 may navigate from the user interface 150 to the user interface 152 when the unreads indicator 154 (in the user interface 150) is selected, and the user computing device 104 may navigate from the user interface 152 to the user interface 150 when the home indicator 156 (in the user interface 152) is selected.

As illustrated in FIG. 1, the user interfaces 150 and 152 may present data associated with one or more communication channels and, in some examples, one or more workspaces. That is, in some examples, the user interfaces 150 and 152 may integrate data from multiple workspaces into a single user interface so that the user (e.g., of the user computing device 104) may access and/or interact with data associated with the multiple workspaces that he or she is associated with and/or otherwise communicate with other users associated with the multiple workspaces. For example, a first region or pane 158 (e.g., header region) may include indicator(s) (e.g., user interface element(s) or object(s)) associated with workspace(s) with which the user (e.g., account of the user) is associated. In some examples, the first region 158 may include a workspace identifier 160 (e.g., "WSA" indicating "Workspace A") that, when selected, opens a sidebar or other user interface (e.g., other pane or window) that allows selection of, or addition of, a different workspace (not explicitly shown in FIG. 1).

In examples, the user interface 150 may include a second region 162, or pane, that includes indicator(s) (e.g., user interface element(s) or object(s)) representing data associated with the workspace(s) (e.g., Workspace A in FIG. 1) with which the user (e.g., account of the user) is associated. For example, the second region 162 may include indicators related to mentions/reactions (e.g., messages shared among a group that include a reaction to a message posted by the UserAB or that mention UserAB); indicators related to communication threads associated with a user account (e.g., threads on which UserAB is included or to which UserAB has access); unread communications shared with a user account (e.g., to which UserAB has access); channels of which a user account is a member (e.g., channels of which UserAB is a member); direct message exchanges with other users; etc. In addition, the user interface 150 may include a third region 164 (e.g., footer region) with other indicators (e.g., user interface element(s) or object(s)) that are selectable to navigate to a different user interface, pane, or window. In some examples, the indicators presented in the third region 164 may be persistently displayed in the third region 164 when the user computing device 104 navigates from one user interface to another user interface (e.g., when the content in the region 158 and/or 162 changes). For example, the third region 164 may include the home indicator 156 that navigates to a home screen (e.g., the user interface 150). Further, in some examples, the third region 164 may include a direct message indicator 166 that navigates to a window displaying one or more direct message threads, as well as a mentions/reactions indicator 168 that navigates to a window displaying communications that mention the UserAB and/or react to a communication posted by the UserAB. The third region 164 may include one or more other selectable indicators, such as a search element and the profile indicator 153.

As indicated above, selection of indicators included in the user interface 150 may cause navigation to a different user interface. For example, selection of the unreads indicator 154 may cause presentation of the user interface 152. In examples, the different user interface may include one or more regions that may be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, such data may be associated with an indication of which user (e.g., member of the communication channel) posted the message and/or performed an action. Further, in some examples, such data may be associated with an indication of in which channel, direct message, or other virtual space the communication was posted. In addition, in examples where the data may be associated with multiple workspaces, at least some data may be associated with an indication of which workspace the data is associated with. Many of these examples are depicted in the user interface 152. For example, the user interface 152 presents a feed indicating two messages (e.g., unread messages) posted to "Channel-A." In the example of FIG. 1, a first message was posted at 2:55 by UserCD, and a second message was posted at 3:05 by UserEF.

In at least some examples, the user interfaces 150 and 152 may present one or more notifications associated with the communication application 140 (e.g., generated by the notifications manager 148). Notifications may provide alerts of various events or occurrences, such as, but not limited to, receipt of data associated with the user account (e.g., receipt of a mention, a reaction, a direct message, a channel message, a shared document, etc.); an upcoming calendar event or other scheduled time duration; and/or receipt of data from another application (e.g., other application(s) 144). In addition, notifications may be presented in various manners using one or more output devices of the I/O devices 138. In some examples, a notification may include one or more of a visual component, audible component, haptic component, etc. For example, a visual indicator may include a change in font (e.g., bolding), a counter that is updated, a badge displayed near another user interface element, a banner, a popup, etc.

Referring to the user interfaces 150 and 152, various examples of notifications are illustrated. For example, a first notification 170 includes the bolding "unreads" text, which may indicate that data (e.g., messages, events, etc.) has been shared with the user account UserAB that has not been read. In addition, a second notification 172 may include a counter that is incremented with each new data. A third notification 174 may include a badge (e.g., depicted as an asterisk and that could alternatively be one or more various other shapes) that is presented adjacent to the home indicator 156, and a fourth notification 176 may include another badge that is presented adjacent to the reactions/mentions indicator 168 when UserAB has unread reactions and/or mentions. These are some of the examples depicted in FIG. 1, and other notifications are also illustrated, including other bold text and counters associated with "mentions/reactions" and "threads." Other types of notifications (e.g., banners, lock screen notifications, etc.) may also be presented as will be described in more detail in FIG. 2. In at least one example, the notifications manager 148 may, based on contextual data and without needing explicit input from a user, refrain from presenting a notification, such as one or more of the notifications depicted in FIG. 1. In at least one example, the notifications manager 148 may, based on contextual data and without needing explicit input from a user, present at least one notification while refraining from presenting at least one or more other notifications.

In at least some examples, the user interfaces 150 and 152 may also present a user status indicator indicating a user status associated with a user account. For example, a first user status indicator 178 (e.g., "A") indicates an "active" status, which suggests a user may be available to engage or interact via the application 140. In some examples, a second user status indicator 180 (e.g., "X") indicates a non-available status (e.g., away, DND, vacation, sick, inactive, etc.), which suggests that a user may not available to interact with, engage, answer, or post via the application 140. In other examples, the user status indicator may include a color, shape, or other type of indictor. In some examples, a user status may be selected by a user (e.g., via the user computing device 104), such as in a profile user interface (e.g., accessible via the profile indicator 153). For example, a user may set a user status to "away;" "DND," "vacation;" "focus mode," etc. In some examples, as described in this disclosure, a user status may be determined (e.g., by the user-status manager 146) based on contextual data without needing a user to manually designate the user status. In some examples, as described in this disclosure, the notifications manager 148 may refrain from presenting one or more notifications based on a user status.

In at least one example, the operating system 142 may manage the processor(s) 132, computer-readable media 134, hardware, software, etc. of the server(s) 102.

The communication interface(s) 136 may include one or more interfaces and hardware components for enabling communication with various other devices (e.g., the user computing device 104), such as over the network(s) 106 or directly. In some examples, the communication interface(s) 136 may facilitate communication via Websockets, APIs (e.g., using API calls), HTTPs, etc.

The user computing device 104 may further be equipped with various input/output devices 138 (e.g., I/O devices). Such I/O devices 138 may include a display, various user interface controls (e.g., buttons, joystick, keyboard, mouse, touch screen, etc.), audio speakers, connection ports and so forth.

While techniques described herein are described as being performed by the workspace management component 116, the channel management component 118, the user-status managers 119 and/or 146, the notifications manager 120 and/or 148, and the communication application 140, techniques described herein may be performed by any other component, or combination of components, which may be associated with the server(s) 102, the user computing device 104, or a combination thereof.

Figure 2:
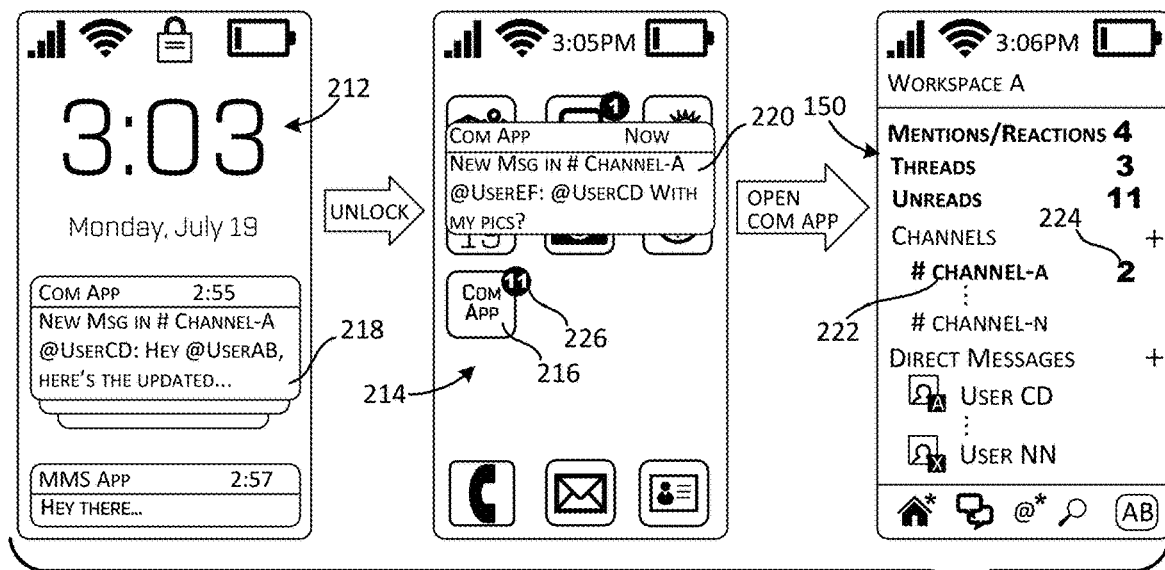
FIG. 2 illustrates a user computing device with notifications presented at a first time and with notifications refrained from presentation during a second time, as described herein.
Figure 2:
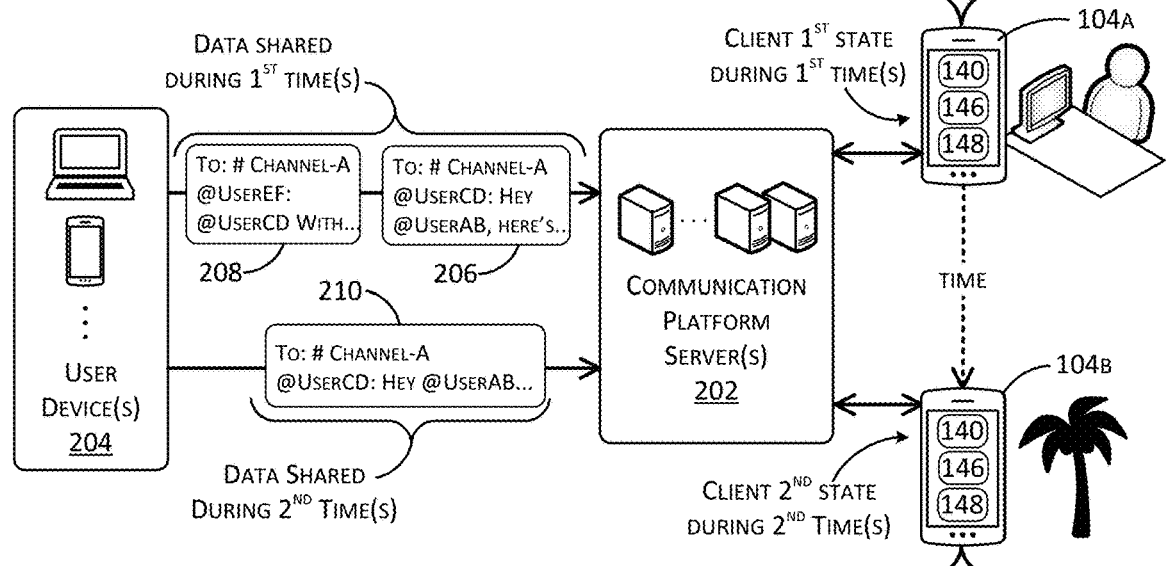
Figure 2:
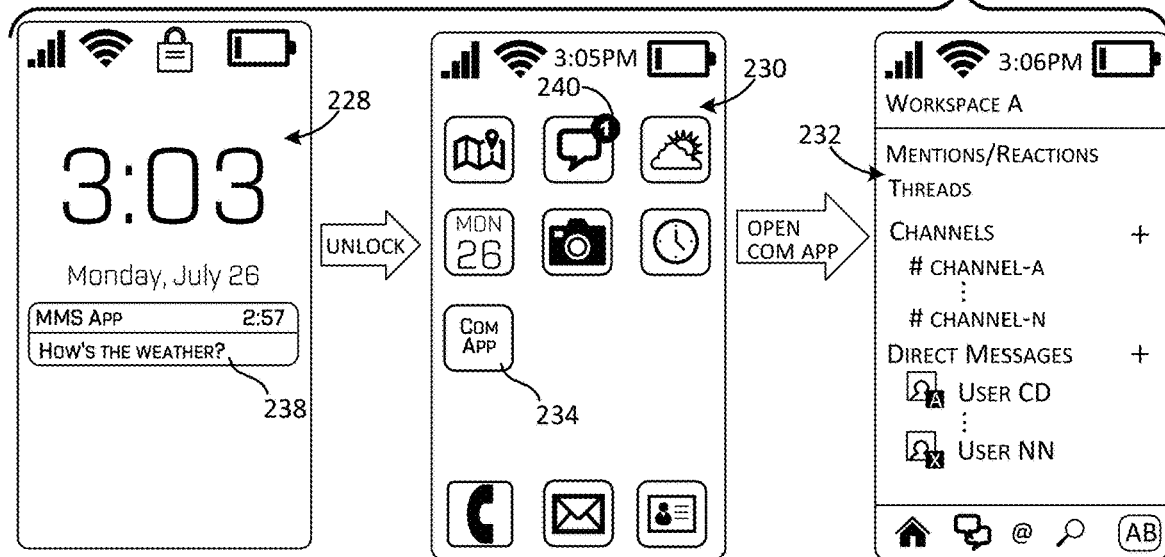

Referring now to FIG. 2, FIG. 2 illustrates, among other things, additional details associated with the user interface 150 (as well as other user interfaces), user status, notifications, and other aspects described above with reference to FIG. 1. That is, FIG. 2 illustrates the user computing device 104 associated with a first state during one or more first times and with a second state during one or more second times. For clarity of explanation, the user computing device 104 associated with the first state is associated with a reference numeral 104a (e.g., user computing device 104a), and the user computing device 104 associated with the second state is associated with a reference numeral 104b (e.g., user computing device 104b). In addition, as used in this disclosure, the term "client" may refer to the user computing device 104 and/or the communication application 140 executed by the user computing device 104.

FIG. 2 also depicts one or more communication platform server(s) 202 (e.g., may be similar to the server(s) 102), as well as user device(s) 204, which may be similar to the user computing device 104. In some examples, the user device(s) 204 may share data with the user computing device 104a and/or 104b via the communication platform server(s) 202. For example, as depicted in FIG. 2, the user device(s) 204 may share, during a first time duration, first data 206 and second data 208 with the user computing device 104a, and the user device(s) 204 may share, during a second time duration, third data 210 with the user computing device 104b.

In examples of this disclosure, one or more notifications may be created, based on the data 206, 208, and/or 210 shared by the user device(s) 204. In addition, a presentation or form of the one or more notifications may differ depending on a state of user computing device 104a and/or 104b. For example, the user computing device 104a includes a lock screen interface 212, which may be presented when the user computing device 104a is locked. In addition, the user computing device 104a may include a device home screen interface 214, which may be presented when the user computing device 104a is unlocked and presenting applications executable by, or downloaded to, the user computing device 104a. In addition, the user computing device 104a may include the user interface 150 (also described in association with FIG. 1), which may be an application home screen interface presented when the application icon 216 (presented in the device home screen interface 214) is selected.

In FIG. 2, the data 206 includes a message from UserCD that is posted to Channel-A and that mentions UserAB. The data 206 may be sent, via the communication platform server(s) 202, to the user computing device 104a, and based on the data 206, the notifications manager 148 (discussed with respect to FIG. 1) may generate a notification. In the example illustrated by FIG. 2, the user computing device 104a may be in a locked state when the notification associated with the data 206 is provided by the notification manager 148, such that the lock screen notification 218 is rendered. Although not depicted in FIG. 2, the notification 218 (or a version thereof) may also be viewable in a notification center interface of the user computing device 104a. In another example, the data 208 includes a message from UserEF that is posted to Channel-A. The data 208 may be sent, via the communication platform server(s) 202, to the user computing device 104a, and based on the data 208, the notifications manager 148 may generate a notification. In the example illustrated by FIG. 2, the user computing device 104a may include the device home screen interface 214 when the notification is provided by the notification manager 148, such that a banner notification 220 is rendered (e.g., presented along a top portion or bottom portion of the device home screen UI 214). In addition, other notifications that are based on the data 206 and 208 may include bolding the "channel-a" text 222 in the user interface 150 and/or incrementing the counter 224. Furthermore, notifications may include presenting a badge 226 in association with the application icon 216 and/or incrementing a numerical value or counter of the badge 226. In some examples, a notification may also include presenting a badge in association with the home indicator (e.g., FIG. 1 including the badge 174 in association with the home indicator 156).

In some examples, the provision and/or rendering of notifications may depend on a user status (e.g., provided by the user-status manager 146). For example, when a user status is "active," notifications may be generated and rendered without delay when a notification trigger occurs. In some examples, a user status may delay or suspend notifications from being rendered. For example, when a user status suggests a user or user account is not available, then the notification manager 148 may refrain from providing a notification. In that instance, suspended notifications may be stored by the notifications manager 148 until the user status changes to indicate the user or user account is available. For example, the notifications manager 148 may poll the user-status manager 146 to determine when a user status changes and/or the user-status manager 146 may push a message to the notification manager 148 when a user status changes, which may trigger the notifications manager 148 to present the stored notifications. In other instances, a notification schedule may specify some time durations when notifications should be suspended (e.g., 8 PM to 8 AM) and other time durations when notifications should be provided (e.g., 8 AM to 8 PM). In that instance, notifications generated during the suspension period may be stored and, upon expiration of the suspension period, presented.

In some examples, the user-status manager 146 may determine, based on contextual data, a user status (e.g., inferred user status). That is, the user-status manager 146 may infer, based on contextual data and without needing input from a user via the user computing device 104, a user status. For example, in FIG. 2, first contextual data may be associated with the user computing device 104a during the first time(s), and second contextual data may be associated with the user computing device 104b during the second time(s). The notification manager 148 may, based on the second contextual data satisfying a condition, refrain from presenting notifications during the second time(s). For example, during the second time(s) the user device(s) 204 may post a new message or data 210 to Channel-A from UserCD and mentioning UserAB, and based on the condition being met, the notification manager 148 may refrain from presenting a corresponding notification on the user computing device 104b.

A notification may be suspended or refrained from presentation in various manners. For example, as depicted in FIG. 2, suspending presentation of one or more notifications may include not presenting the one or more notifications on the lock screen user interface 228 (or a notification center interface) or not presenting an audible and/or haptic notification. In some examples, suspending presentation of one or more notifications may include not presenting the one or more notifications on the device home screen user interface 230 (e.g., as a badge on the icon 234, in banner form across the header, etc.). In at least some examples, suspending presentation of one or more notifications may include not presenting the one or more notifications in a user interface 232 associated with the communication application 140. In addition, suspending presentation of one or more notifications may include removing presentation of a notification. For example, the notification manager 148 may, based on contextual data, remove or stop presentation of, among other things, a badge (e.g., badge 226) associated with the icon 234, unbolden text in the user interface 232, remove counters (e.g., 224), and the like. In some examples, the notification suspension may be specific to the communication application 140, such that the user computing device 104b may still present other notifications, such as the lock screen notification 238 and/or the badge notification 240. As such, a user may still have an opportunity to perceive notifications related to applications other than the communication application 140.

Contextual data may include various types of information. In some examples, contextual data may include information describing the user computing device 104. For instance, the contextual data may include location data (e.g., from a GPS sensor or triangulation), motion data from one or more sensors 139, and/or data indicating a signal strength associated with a communication network (e.g., Wi-Fi, cellular, etc.). In some examples, contextual data may include scheduling or calendar data associated with the communication application 140 and/or with one or more other applications 144. For example, the contextual data may indicate working hours, non-working hours, paid time off, unpaid time off, sick time, scheduled meetings or appointments, etc. In some examples, contextual data may include data associated with one or more levels of member or user engagement with the communication application 140. For example, the contextual data may include one or more rate(s) of data sharing associated with a channel, workspace, direct message thread (s), etc. In some examples, the contextual data may include a quantity of other user accounts having a user status. For example, the contextual data may include a quantity of user accounts (e.g., associated with a channel and/or a workspace) having some available user status (e.g., active) compared to a quantity of user accounts having some unavailable user status (e.g., DND).

In examples, contextual data may be used in various ways by the user-status manager 146 to determine a user status (e.g., by inference). For instance, contextual data may be compared to a condition to determine whether the condition is met. A condition may depend on the type of contextual data. For example, when considering location-based contextual data, a condition may include an address, geographic area, and/or coordinate-based area, such that comparing the location-based contextual data to the condition includes determining whether the user computing device 104 is physically located at the address or within the area. In some examples, if the computing device 104 is not physically located at the address or within the defined geographic area, then notification presentation may be suspended. In some examples of location-based contextual data, a condition may include a threshold distance. For example, the notification manager 148 may refrain from presenting notifications if a location associated with the user computing device 104b is not within a threshold distance of another location (e.g., a workplace address, a coordinate set, etc.). In that example, a distance may be calculated between the location of the user computing device 104b indicated by the contextual data and the other location, and the distance may be compared to the threshold distance to determine whether to refrain from presenting notifications (e.g., notification presentation may be suspended when the distance exceeds the threshold distance).

Various other types of conditions associated with other contextual data (e.g., associated with the client $2^{nd}$ state during the $2^{nd}$ times) may also be used to infer user status and/or determine when to refrain from presenting notifications. For example, when considering motion-based contextual data, a condition may include a threshold speed, such that comparing the motion-based contextual data to the condition includes determining whether a speed indicated by the motion-based contextual data exceeds the threshold speed. In at least some examples, the notification manager 148 may refrain from presenting one or more notifications when a speed indicated by the motion-based contextual data exceeds the threshold speed.

In at least some examples, the notification manager 148 may refrain from presenting one or more notifications based on contextual data including a network signal strength (e.g., as indicated by a device transceiver or other signal exchanging component). For example, when considering signal-strength contextual data, a condition may include a threshold strength, such that comparing the signal-strength contextual data to the condition includes determining whether signal strength indicated by the contextual data exceeds the threshold signal strength. In at least some examples, the notification manager 148 may refrain from presenting one or more notifications when a signal strength indicated by the contextual data is less than a threshold signal strength.

In at least some examples, the notification manager 148 may refrain from presenting one or more notifications based on calendar-based contextual data, such as one or more scheduled times associated with a calendar. For example, the communication application 140 may include a calendar application (e.g., tool for scheduling meetings, appointments, etc.) or may receive calendar-based contextual data from a third-party calendar application (e.g., application 144 in FIG. 1). In some examples, when considering calendar-based contextual data, a condition may include whether a notification presentation would occur or be executed during a scheduled time or within a threshold time duration of a scheduled time. For example, calendar-based contextual data may indicate that a scheduled time (e.g., vacation, meeting, appointment, focus mode, DND, non-working hours, etc.) extends for a duration from a first time to a second time (e.g., 8 PM to 8 AM), and the notification manager 148 may refrain from presenting a notification if the presentation would be executed at a third time (e.g., 10 PM) that is within the duration and/or is within a threshold time duration (e.g., 1 hour) of the duration.

In at least some examples, the notification manager 148 may refrain from presenting one or more notifications based on user-engagement contextual data, which may indicate a level of member or user engagement with the communication platform or with respective instances of the communication application 140. For example, user-engagement contextual data may indicate a rate at which users are posting or sharing data to, or exchanging communications associated with, a virtual space (e.g., a rate at which users having access to data shared on "Channel-A" are sharing data or communications associated with Channel-A). As such, the notification manager 148 may refrain from presenting a notification if the rate does not satisfy a threshold rate (e.g., the rate of data sharing or posting is too low and may suggest users are not currently available to interact via the virtual space). In some examples, the user-engagement contextual data may indicate a quantity, percentage, and/or ratio of users having a user status (e.g., explicit or inferred) that at least partially triggers suspended notification presentation. As such, the notification manager 148 may refrain from presenting a notification if the quantity, percentage, or ratio of users having paused notifications exceeds a threshold. For example, the notification manager 148 may refrain from presenting a notification associated with Channel-A on the user computing device 104b when the percentage of users that have access to Channel-A and that include paused notifications exceeds a threshold percentage (e.g., 50%).

In FIG. 2, one or more notifications associated with the message or data 210 may be temporarily suspended based on various contextual data. In examples of the present disclosure, expiration of the suspension period may be determined in various manners. For example, in some instances, additional contextual data may be received and analyzed to determine whether a condition is still met (e.g., based on comparing the additional contextual data to a threshold). In some examples, based on the additional contextual data, the one or more suspended notifications may be presented, such as when the condition that triggered the suspension is no longer satisfied and/or when a different condition is satisfied. For example, if the notification manager 148 refrained from presenting a notification based on first location-based contextual data, then second location-based contextual data may be received (e.g., at a later time) and analyzed to determine whether a condition is still met (e.g., whether a distance of the user computing device 104b from a location exceeds a distance threshold). In other examples, if presentation of a notification was suspended based on first motion-based contextual data, then second motion-based contextual data may be compared to a threshold speed to determine whether a condition is still satisfied (e.g., the suspended notification may be presented when the motion speed is less than the threshold speed). In at least some examples, if a notification is suspended based on first signal-strength contextual data, then second signal-strength contextual data may be compared to a threshold strength to determine whether a condition is satisfied (e.g., the suspended notification may be presented when the signal strength exceeds the signal threshold). In at least some examples, if presentation was paused based on first user-engagement contextual data, then second user-engagement contextual data may be compared to a threshold rate to determine whether a condition is still satisfied (e.g., the suspended notification may be presented when the rate of user posting to a channel exceeds a threshold rate, such as a threshold data-posting rate).

As explained above, in at least some examples, notification presentation may be suspended based on contextual data, without needing a user to explicitly change a setting. In addition, notification presentation may be suspended or paused based on explicit input provided by a user (e.g., changing a status to DND or vacation or starting a pomodoro timer). However, suspending the presentation of all notifications may affect notifications associated with time-sensitive alerts and/or other notifications that would preferably be presented. Referring to FIG. 3A, FIG. 3A depicts the user computing device 104c (e.g., may be similar to the user computing device 104 in FIG. 1), which includes the notifications manager 148 that is pausing, suspending, or otherwise refraining from presentation, at least some notifications. In addition, FIG. 3A depicts one or more communication platform server(s) 302 (e.g., may be similar to the server(s) 102), as well as user device(s) 304, which may be similar to the user computing device 104. In some examples, the user device(s) 304 may share data with the user computing device 104c via the communication platform server(s) 302. For example, as depicted in FIG. 3A, the user device(s) 304 may share, while the notifications manager 148 is refraining from presenting notifications, first data 306 and second data 308 with the user computing device 104c. In some examples, the first data 306 and/or the second data 308 may be auto-generated by an automated user account (e.g., bot account). At least some examples of the present disclosure include, based on contextual data and without needing explicit input from a user, presenting one or more first notifications while refraining from presenting one or more second notifications.

As depicted in FIG. 3A, the user device(s) 304 may post a new message or data 306 to Channel-A from UserCD and mentioning UserAB. In examples of the present disclosure, the notification manager 148 may refrain from presenting a corresponding notification on the user computing device 104bc. For example, the notifications manager 148 (or the notifications manager 120) may receive status data (e.g., active pomodoro timer or context-based status) indicating notification presentation is suspended. The notification corresponding to the new message or data 306 may be suspended or refrained from presentation in various manners. For example, as depicted in FIG. 3A, suspending presentation may include not presenting a notifications on the lock screen user interface 328 (or a notification center interface) or not presenting an audible and/or haptic notification. In some examples, suspending presentation of one or more notifications may include not presenting the one or more notifications on the device home screen user interface 330 (e.g., as a badge on the icon 334, in banner form across the header, etc.). In at least some examples, suspending presentation of one or more notifications may include not presenting the one or more notifications in a user interface 332 associated with the communication application 140. For example, although the message or data 306 was posted to "Channel-A," the channel-a indicator 322 is not bolded.

In at least some examples, although some notifications may be paused (e.g., a notification associated with the message or data 306), based on contextual data and without needing a user to explicitly change a setting, one or more other notifications may be presented. For example, the data 308 includes a message from UserGH that is posted to Channel-B and that mentions UserAB. In the example illustrated by FIG. 3A, the user computing device 104c may be in a locked state when the notification associated with the data 308 is provided by the notification manager 148, such that the lock screen notification 318 is rendered. Although not depicted in FIG. 3A, the notification 318 (or a version thereof) may also be viewable in a notification center interface of the user computing device 104c. In another example, the user computing device 104c may include the device home screen interface 330 when the notification (related to the message/data 308) is provided by the notification manager 148, such that a banner notification (not illustrated) is rendered and/or a badge indicator 326 is presented in association with the application icon 334. In addition, other notifications that are based on the data 308 may include bolding the "channel-b" text 324 in the user interface 332. In some examples, a notification may also include presenting a badge 374 in association with the home indicator 356.

Various types of contextual data may be analyzed when determining when to present a notification (e.g., a notification associated with the message/data 308) that might otherwise be paused (e.g., the notification(s) associated with the message or data 306). In at least some examples, contextual data may include a level of user engagement with a virtual space. For example, the notifications manager 148 may be in a state that refrains from presenting notifications (e.g., based on explicit user status or inferred user status); however, a relatively high level of activity or user engagement associated with a channel may be used to infer that a user would prefer to receive notifications associated with that particular virtual space. Referring to FIG. 3A, channel-b may be associated with a level of user engagement (e.g., rate of data and/or communication posting or user reactions or messaging) that exceeds a threshold level (e.g., threshold rate), and as such, one or more notifications (e.g., 318, 326, 324, and/or 374) associated with the message/data 308 may be presented, while notifications associated with the message/data 306 are paused.

At least some examples of the present disclosure may include, while at least some notifications are suspended (e.g., notifications associated with the message/data 306), presenting a notification based on calendar contextual data (e.g., indicating a time-sensitive event or item). For example, data associated with a calendar application may indicate that a meeting, appointment, or other scheduled time was previously not rejected or declined by UserAB. As such, even though a user status, notification schedule, and/or some contextual data may trigger suspension of notification presentation (e.g., associated with the message/data 306), a notification associated with the calendar application may still be presented based on the contextual data indicating the scheduled time was not rejected or declined. For example, the badge 326 may be incremented and/or the "calendar" text 380 may be presented and bolded (as depicted). In at least some examples, a communication triggering the notification associated with the calendar application may be auto-generated by an automated user account (e.g., "bot" user account).

In some examples, while notification presentation is suspended (e.g., based on contextual data and/or a user-provided setting or status update), various operations may be executed to potentially limit user interaction with the communication application 140 and/or the communication platform. For example, referring to FIG. 3B, FIG. 3B illustrates an interface 380, which may be presented (e.g., as an overlay in front of the interface 332), when the application icon 334 is selected. In some examples, the interface 380 may include a request for an additional input to confirm the request to open the communication application 140. In some instances, the interface 380 may assist a user with taking a break from at least some portions of the communication application 140. For example, the interface 380 may remind a user of potential preferences to not open work-related virtual spaces when the user is not at work or to not open the communication application 140 during non-working hours or when the user is on vacation.

In some instances, a user may, via a user account and while notification presentation is suspended (e.g., based on contextual data and/or a user-provided setting or status update) with respect to the user account, submit a message or other data to be posted to a channel. For example, referring to FIG. 3C, FIG. 3C illustrates an interface 382 that may be presented upon selection of the channel-a indicator 322 in the interface 332 (FIG. 3A). The interface 382 presents a thread or feed of messages that have been posted to Channel-A. In addition, the interface 382 includes an input field 384, and, using an input device (e.g., touch keyboard, speech-to-text, etc.), the input field 384 may be populated with a message. In addition, one or more files (e.g., documents, pictures, videos, etc.) may be attached to the message. The interface 382 also includes an indicator 386 that, when selected, posts, sends, and/or submits the message that is input into the input field 384.

In some examples of the present disclosure, the posting of the message or other data to the virtual space (e.g., to Channel-A in the example of FIG. 3C) may be, based on contextual data, delayed or suspended. That is, even though the indicator 386 may be selected, the posting of the message may be, based on contextual data, temporarily delayed, suspended, or paused. For example, if the indicator 386 is selected at 3:06 PM, then, based on contextual data, the actual posting may be delayed, and the message 388 may be posted to Channel-A at a later time (e.g., at 4:31 after updated contextual data is received). In at least some examples, when the indicator 386 is selected, based on contextual data, another interface (not shown) may be presented requesting confirmation of whether the posting should be delayed (e.g., until the context changes) or executed at that time. As explained in other parts of this disclosure, delaying posting a message may be based on various types of contextual data associated with the user computing device, the user account posting the message (e.g., UserAB in FIGS. 3A-3B), the virtual space (e.g., Channel-A). Some examples of contextual data may include location-based contextual data, motion-based contextual data, calendar-based contextual data, and user-engagement contextual data. For example, posting may be delayed based on a physical location failing to satisfy a threshold distance (e.g., beyond a threshold distance away from a designated physical location); based on a level of user engagement failing to satisfy an engagement rate threshold (e.g., when activity on a channel is too low); or based on the time at which the indicator 386 is selected falling inside a scheduled time (e.g., the time being within a scheduled vacation time).

Figure 4:
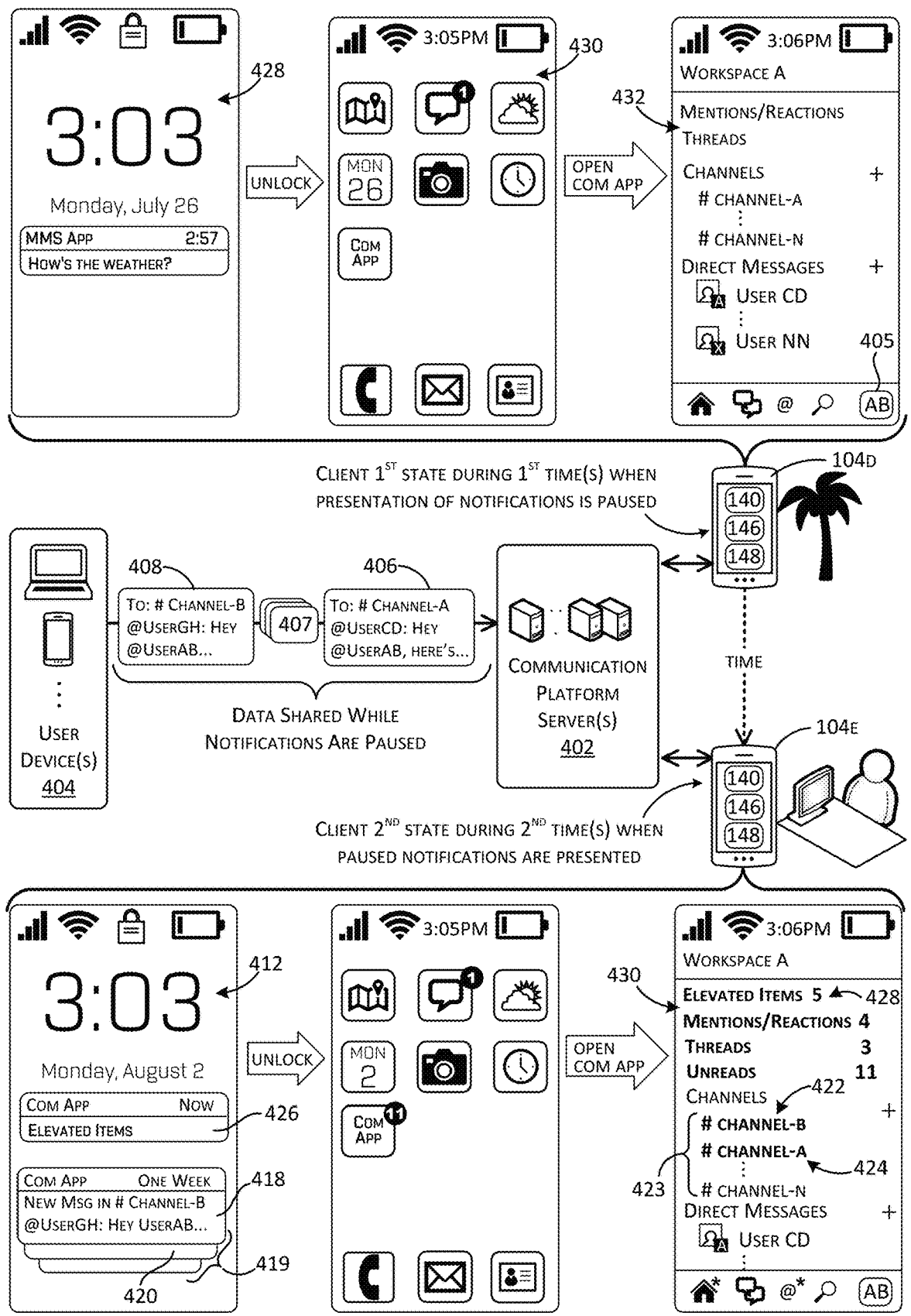
FIG. 4 illustrates a user computing device with interfaces depicting prioritized presentation of paused notifications, as described herein.

Reference is now made to FIG. 4. As explained above, in at least some examples, during a suspension period in which notification presentation is paused, various items associated with a user account may be generated. In addition, presentation of notifications associated with at least some of these items may be suspended, such that a group of paused notifications may be generated. In accordance with some examples, once a suspension period has expired, notifications that were suspended from presentation may be presented in a prioritized manner. For example, contextual data associated with a first notification may be compared to contextual data associated with a second notification to rank the first and second notifications. In at least some examples, a subset of the paused notifications and/or the items associated with the paused notifications may be determined, based at least in part on contextual data, to be higher importance or more relevant (e.g., elevated items). As such, in some instances, these elevated items and/or the notifications associated with the elevated items may be presented in a prioritized manner (e.g., separate from the other notifications or items generated during the suspension period). In some examples, a summarized brief including items with high priority may be presented during a suspension period. In some examples, notifications may not be sent for summarized brief items, but the notifications may be presented in the communication application when the application is opened. In some examples, the summarized brief notifications may be presented in a separate section associated with summarized brief notifications only.

FIG. 4 illustrates a user computing device associated with a first state (e.g., non-working state such as on vacation, not physically located at a workplace, or during non-working hours) during first times (when presentation of at least some notifications is paused) and with a second state (e.g., working state, such as physically located at a workplace or during working hours) during second times (when paused notifications are presented). For clarity of explanation, the user computing device associated with the first state is associated with a reference numeral 104d (e.g., user computing device 104d), and the user computing device associated with the second state is associated with a reference numeral 104e (e.g., user computing device 104e). That is, the user computing device 104d may include the notifications manager 148 that is pausing, suspending, or otherwise refraining from presentation, at least some notifications, and the user computing device 104e may include the notifications manager 148 that is now (e.g., based on contextual data or other expiration of a suspension period) presenting paused notifications. FIG. 4 also depicts one or more communication platform server(s) 402 (e.g., may be similar to the server(s) 102), as well as user device(s) 404, which may be similar to the user computing device 104. In some examples, the user device(s) 404 may share data with the user computing device 104d via the communication platform server(s) 402. For example, as depicted in FIG. 4, the user device(s) 404 may share, when presentation of notifications is paused, first data 406 and second data 408 with the user computing device 104d. In addition, one or more other items 407 may be generated in association with the user account for UserAB (e.g., represented by the user profile button 405). For example, the items 407 may include messages or reactions posted to one or more channels or other communication threads to which the user account has access; a user may be mentioned in messages or posts; data may be shared with a user account; a user account may receive direct messages; tasks may be shared (e.g., assigned) to a user account for completion; calendar events may have been created and/or are scheduled to begin; and the like.

At least some examples of the present disclosure include, based on contextual data associated with notifications, presenting paused notifications in a prioritized manner. For example, as depicted in FIG. 4, the user device(s) 404 may post a new message/data 406 to Channel-A from UserCD and mentioning UserAB. In addition, the user device(s) 404 may post another new message/data 408 to Channel-B from UserGH and mentioning UserAB. However, since both messages/data 406 and 408 are shared while notifications are paused (e.g., while the user computing device 104d is refraining from presenting notifications), as depicted by the interfaces 428, 430, and 432, no notifications associated with the messages/data 406 and 408 are presented. In examples of the present disclosure, the notification manager 148 may rank respective notifications associated with the messages/data 406 and 408 based on one or more criteria, which may include or be based on contextual data. As such, once notification presentation is no longer suspended and paused notifications are to be presented, the notification manager 148 may, based on the context-based ranking, present the notifications associated with the messages/data 406 and 408 in a prioritized manner.

In at least some examples, contextual data that may be used as criteria to rank notifications may include a level of activity associate with a channel, such as a level of activity (e.g., rate of user postings, reactions, shares, messages, etc.) by a subject user account (e.g., UserAB in FIG. 4) and/or level of activity (e.g., rate of user postings, reactions, shares, messages, etc.) across the entire channel (e.g., of all user accounts having access to the channel). For example, a level of activity associated with Channel-A (e.g., to which message/data 406 is posted) may be compared to a level of activity associated with Channel-B (e.g., to which message/data 408 is posted), and the notification(s) associated with the channel with the highest level of activity may be presented with higher priority. Other examples of contextual data that may be used as criteria to rank notifications for prioritized presentation may include a user account associated with each notification, such as whether a user account is identified as a "favorite" contact, "starred" contact, or other type of higher significance identifier.

Prioritized presentation of notifications may take various forms. For example, in some instances, a higher-ranked notification may be presented temporally prior to a lower-ranked notification. In some examples, a higher-ranked notification may be presented prior to a lower-ranked notification in a listing. For example, in FIG. 4, a notification 418 associated with the message/data 408 may be presented, on a lock screen interface 412 and in a notifications listing 419, prior to a notification 420 (presented as underlapped behind the notification 418) associated with the message/data 406, such as when the notification 418 is ranked higher than the notification 420 (e.g., Channel-B being associated with a higher level of activity than Channel-A). In another example illustrated in FIG. 4, when a notification 422 (e.g., "channel-b" in bolded text) associated with the message/data 408 is ranked higher than another notification 424 (e.g., "channel-a" in bolded text) associated with the message/data 406, such as when Channel-B is associated with a higher level of activity than Channel-A, the notification 422 may be presented, in the listing 423, above (more prioritized or more towards the top) the notification 424 associated with the message/data 406.

As illustrated in FIG. 4, when the user computing device 104*d* is in the first state and refraining from presenting notifications, items (e.g., 406, 407, and 408) associated with a user account may be generated, as well as a group of paused notifications (e.g., notifications that were refrained from presentation). In at least some examples of this disclosure, a subset of the paused notifications may be, based at least in part on contextual data, selected from the larger group (e.g., notifications pertaining to items deemed to have higher importance). In addition, upon expiration of the presentation suspension period, the user computing device 104*e* may present the subset of selected notifications in a prioritized manner. For example, the subset of notifications may be presented separately from the larger group of paused notification. In some examples, the subset of notifications may be presented on the lock screen interface 412, whereas the other paused notifications not selected as part of the subset are not presented on the lock screen interface 412. In some examples, the subset of notifications may be presented as a summarized brief of notifications that, based at least in part on the contextual data, are predicted to have higher relevance or importance.

In at least some examples, a high importance notification may be generated that, when presented, indicates to the user perceiving the notification that high importance items (e.g., elevated items) were received during the suspension period. In some examples, the notification may indicate that the elevated items and/or the brief are accessible via a link, such as when the elevated items have been compiled and stored in a folder or other data structure (e.g., possibly separate from other items not selected to be included among the high importance items). For example, an elevated-items notification 426 may be presented on the lock screen interface 412. In some instances, the elevated items notification 426 may be independent from item-specific notifications, such as those item-specific notifications in the listing 419. That is, the elevated-items notification 426 may be associated with a group of elevated items, whereas the notifications in the listing 419 may each be associated with a single item (e.g., message 406). In addition, the elevated-items notification 426 may include a link that, when selected, causes the user computing device 104*e* to navigate to a compiled list of items (e.g., elevated-items brief) deemed to have higher importance or relevance. In at least some examples, an elevated-items notification 428 may be presented in a tabbed view or listing view of the application interface 430. In addition, the elevated-items notification 428 may include a link that, when selected, causes the user computing device 104*e* to navigate to a compiled list of items (e.g., elevated-items brief) deemed to have higher importance or relevance. In at least some examples, the summarized brief of notifications or elevated items may include a personalized list of tasks for the user to complete during a period of time. For example, the summarized brief of notifications may include a list of meetings, tasks, and/or other items for a user to take action on during a designated period of time (e.g., day, week, etc.).

In addition, in some examples, a timing of a presentation of the subset of selected notifications (and/or an elevated-items notification (e.g., 426 and/or 428) alerting the user to the elevated items) may be selected to correspond with a time deemed most likely to effectively alert a user to the notifications. For example, the timing may correspond with the expiration of a suspension period. The expiration may be based on user input, such as when a notification suspension period is set to expire based on user-specified notifications schedule. In some examples, the expiration of the suspension period may be based on a change in contextual data, such as when location data changes (e.g., when a user location corresponds with a workplace) or when non-working hours change to working hours. In some examples, the presentation of the subset of selected notifications and/or the elevated-items notification may correspond with the beginning of working hours, and in this respect, the compilation of elevated items may provide an automated daily briefing for a user associated with the user account. Though described herein as sometimes being presented after a suspension period, this is not intended to be so limiting, and a summarized brief of notifications and/or an elevated-items notification may be presented to a user at another time of day unrelated to a suspension period. In some examples, the user may set, as a user preference, a time associated with the summarized brief of notifications. As such, the user may designate the particular day, time, etc. for the communication platform to surface the summarized brief of notifications. In other words, the user can establish characteristics for the summarized brief of notifications, such as frequency, information included, and the like. For example, a user may set a user preference to receive the summarized brief of notifications at 10 am on weekdays. Based on the user preference, the communication platform may identify one or more tasks for the user to take action on during the day, such as meetings, messages to respond to, information to be disseminated, daily, weekly, and/or quarterly check-ins with customers, and/or the like, and may cause a presentation of the task(s) on a user device of the user at 10 am each weekday.

Relevance or importance of items generated, or notifications paused, during a suspension period may be determined based on various criteria. For example, a variety of different contextual data may be used to select the items included in a brief, which is accessible via the elevated-items notifications 426 and/or 428. In at least some examples, based at least in part on contextual data, the notifications (or the item(s) that triggered the notification) may be predicted to be related to a time-sensitive item (e.g., calendar item, meeting, appointment, task, etc.); an important or relevant topic; an important or relevant person; a channel, thread, or communications feed that is highly active; and the like. In addition, the subset of notifications and/or items selected for prioritized presentation may be based on various types and/or sources of contextual data. For example, in some techniques of the present disclosure, the subset of notifications and/or items may be selected based on a level of user engagement across a channel, thread, or communications feed (e.g., a rate at which user of the channel are sharing data, reacting to posts, sending messages, etc.). In some examples, elevated-items notification may be presented as part of a group-based communications application of a group-based communications platform and may be selected based on data provided by a third party application (e.g., a third-party application, such as a calendar application, from which the communications platform retrieves data via a data application programming interface (API)). Furthermore, in at least some examples, the subset of notifications and/or the items may be selected based on tasks assigned (e.g., for completion) to the user account associated with the profile 405. In some examples, the high importance notification may be determined based on metadata included in a message, such as an indication that a message is marked as "urgent," a mention (e.g., @mention) of the user in the message, or the like.

Figure 5B:
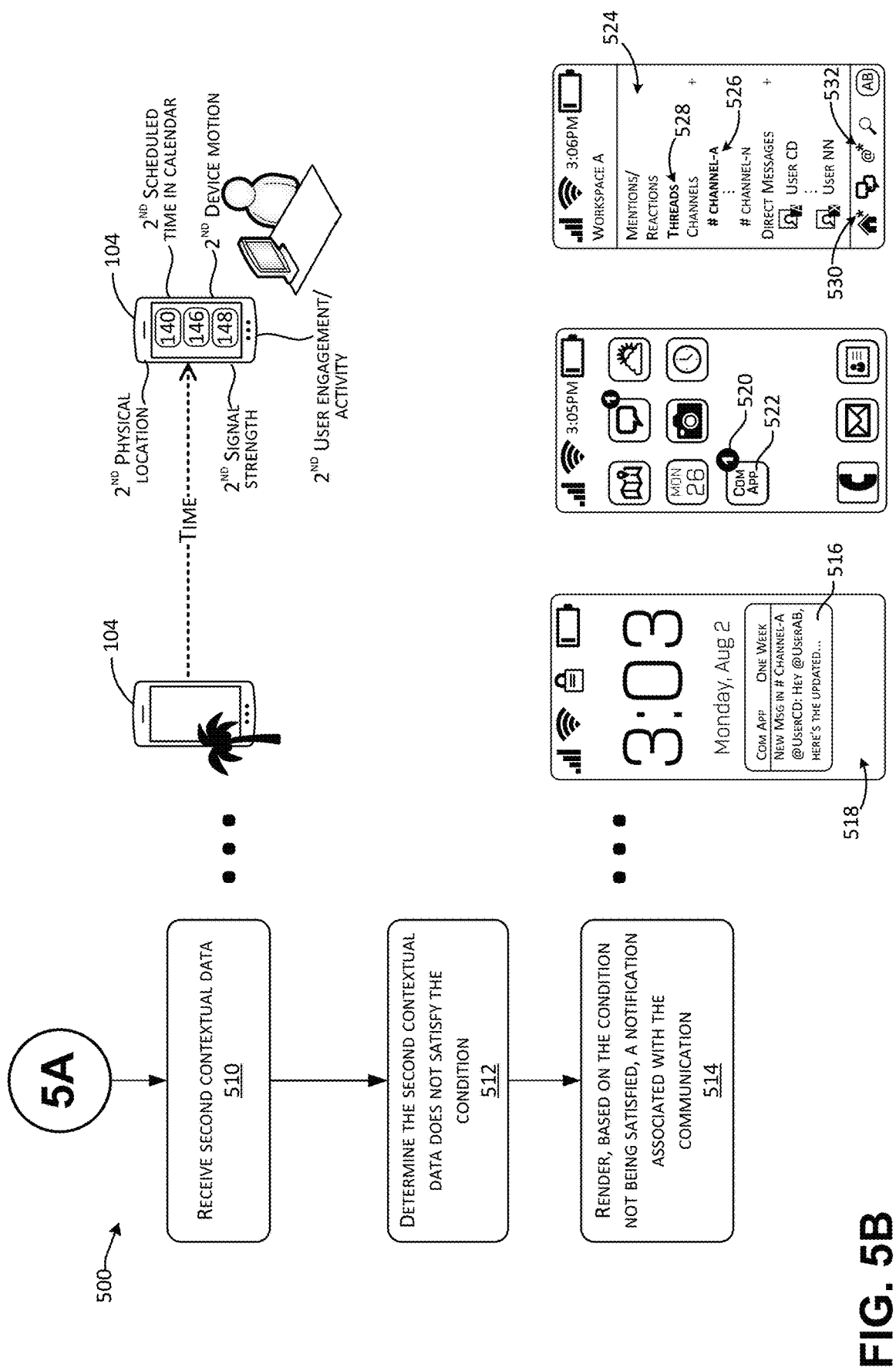

Referring to FIGS. 5A and 5B, an example process 500 is illustrated for managing presentation of one or more notifications based on a contextual data. In some instances, some or all of process 500 may be performed by one or more components in the environment 100. For example, the process may be performed by the user-status manager 119 (on the server(s) 102), the notifications manager 120 (on the server(s) 102), the user-status manager 146 (on the user computing device 104), the notifications manager 148 (on the user computing device 104), or any combination thereof. By way of example and not limitation, the communication platform referred to in process 500 may be representative of a computing device associated with the (communication platform) server(s) 102, a client referred to in process 500 may be representative of the user computing device(s) 104 and/or application 140. However, the process 500 is not limited to being performed by components in the environment 100.

At operation 502, contextual data is received from a first client associated with a first user account of a communication platform, and the contextual data is associated with at least one of the first client or user interaction with the communication platform (e.g., data exchange between the communication platform and one or more user accounts). In examples, the first user account is associated with a communication channel configured to share data between a group of user accounts granted access to the communication channel. For example, contextual data may be received by one or more of the user-status managers 119 or 146 or the notifications managers 120 or 148. The contextual data may include, by way of example and not limitation, one or more of location-based contextual data indicating a physical location of the user computing device 104; signal contextual data indicating a strength of a network signal received by the user computing device 104; calendar based contextual data indicating one or more scheduled times (e.g., work hours, non-work hours, vacation time, meeting(s), appointment(s), focus time, etc.); motion-based contextual data indicating a motion of the user computing device 104 (e.g., speed); and user-engagement contextual data, which may indicate a level of user engagement with a channel, workspace, or other virtual space (e.g., rate of posting). Although FIG. 5A depicts various contextual data associated with the user computing device 104, the contextual data may also, or alternatively, be associated with the server(s) 102. For example, components of the server(s) 102 may track and provide user-engagement contextual data or other contextual data.

At operation 504, the process 500 includes determining, based on a threshold, that the contextual data satisfies a condition. For example, one or more of the user-status managers 119 or 146 may compare the contextual data to a threshold, which may depend on the nature of the contextual data. For example, if the contextual data includes a physical location, then the threshold may include a threshold distance from a reference location (e.g., workplace), such that a distance may be calculated between the physical location and the reference location, and the distance may be compared to the threshold distance to determine whether a condition is satisfied. In some examples, if the contextual data includes motion-based contextual data, a condition may include a threshold speed, such that comparing the motion-based contextual data to the condition includes determining whether a speed indicated by the motion-based contextual data exceeds the threshold speed. In some examples, when considering signal-strength contextual data, a condition may include a threshold strength, such that comparing the signal-strength contextual data to the condition includes determining whether signal strength indicated by the contextual data exceeds the threshold signal strength. In at least some examples, when considering calendar-based contextual data, a condition may include whether a notification presentation would occur or be executed during a scheduled time or within a threshold time duration of a scheduled time. In at least some examples, user-engagement contextual data may indicate a rate at which users are posting or sharing data to, or exchanging communications associated with the channel, and the rate may be compared to a threshold rate to determine whether a condition is satisfied. At operation 506, a communication is received from a second client associated with a second user account of the communication platform, the communication being posted in association with the communication channel (to which the first client has access). For example, a second client 540 may, via the user device 204, send a communication 210, which may be received by one or more of the communication platform or the communication application.

At operation 508, one or more of the notifications managers 120 or 148 may, based at least in part on a determination that the contextual data satisfies the condition, refrain from rendering a notification indicating the communication is posted in association with the communication channel.

For example, the notifications manager 148 may refrain from presenting the one or more notifications on the lock screen user interface 228 or from presenting an audible and/or haptic notification. In some examples, operation 508 may include not presenting the one or more notifications on the device home screen user interface 230 (e.g., as a badge on the icon 234, in banner form across the header, etc.). In at least some examples, operation 508 may include not presenting the one or more notifications in a user interface 232 associated with the communication application 140.

Referring now to FIG. 5B, at operation 510, the process 500 includes receiving second contextual data associated with the at least one of the first client or the user interaction with the communication platform at a second time. For example, one or more of the user-status managers 119 or 146 or the notifications managers 120 or 148 may receive one or more types of second contextual data associated with the user computing device 104 (or a client of the user computing device 104). The second contextual data may be generated, received, or otherwise associated with a subsequent time, as compared with the contextual data received in operation 502. As indicated above, examples of second contextual data may include of second location-based contextual data indicating a physical location of the user computing device 104; second signal contextual data indicating a strength of a network signal received by the user computing device 104; second calendar based contextual data indicating one or more scheduled times (e.g., work hours, non-work hours, vacation time, meeting(s), appointment(s), focus time, etc.); second motion-based contextual data indicating a motion of the user computing device 104 (e.g., speed); and second user-engagement contextual data, which may indicate a level of user engagement with a channel, workspace, or other virtual space (e.g., rate of posting). Although FIG. 5B depicts various contextual data associated with the user computing device 104, the contextual data may also, or alternatively, be associated with the server(s) 102. For example, components of the server(s) 102 may track and provide user-engagement contextual data or other contextual data.

At operation 512, the process 500 includes determining, based on the threshold, that the second contextual data does not satisfy the condition. For example, the second contextual data may indicate that the user computing device 104 is within a threshold distance of a reference location; that the user computing device 104 is no longer moving at a speed that exceeds a speed threshold; that the user computing device 104 is receiving a network signal having a strength exceeding a threshold strength; that a scheduled time is not currently overlapping with notification presentation; and/or that a rate of user engagement exceeds a rate threshold.

At operation 514, based at least in part on a determination that the second contextual data does not satisfy the condition, a notification associated with the communication (e.g., the communication 506) is caused to be rendered. For example, rendering a notification associated with the communication 506 may include one or more of presenting a notification 516 on the lock screen interface 518; presenting a badge 520 in association with the application icon 522; or presenting, with the application interface 524, a notification, such as the "channel-a" indicator 526 in bolded text, the bolded threads indicator 528, or the badges 530 or 532.

Figure 6:
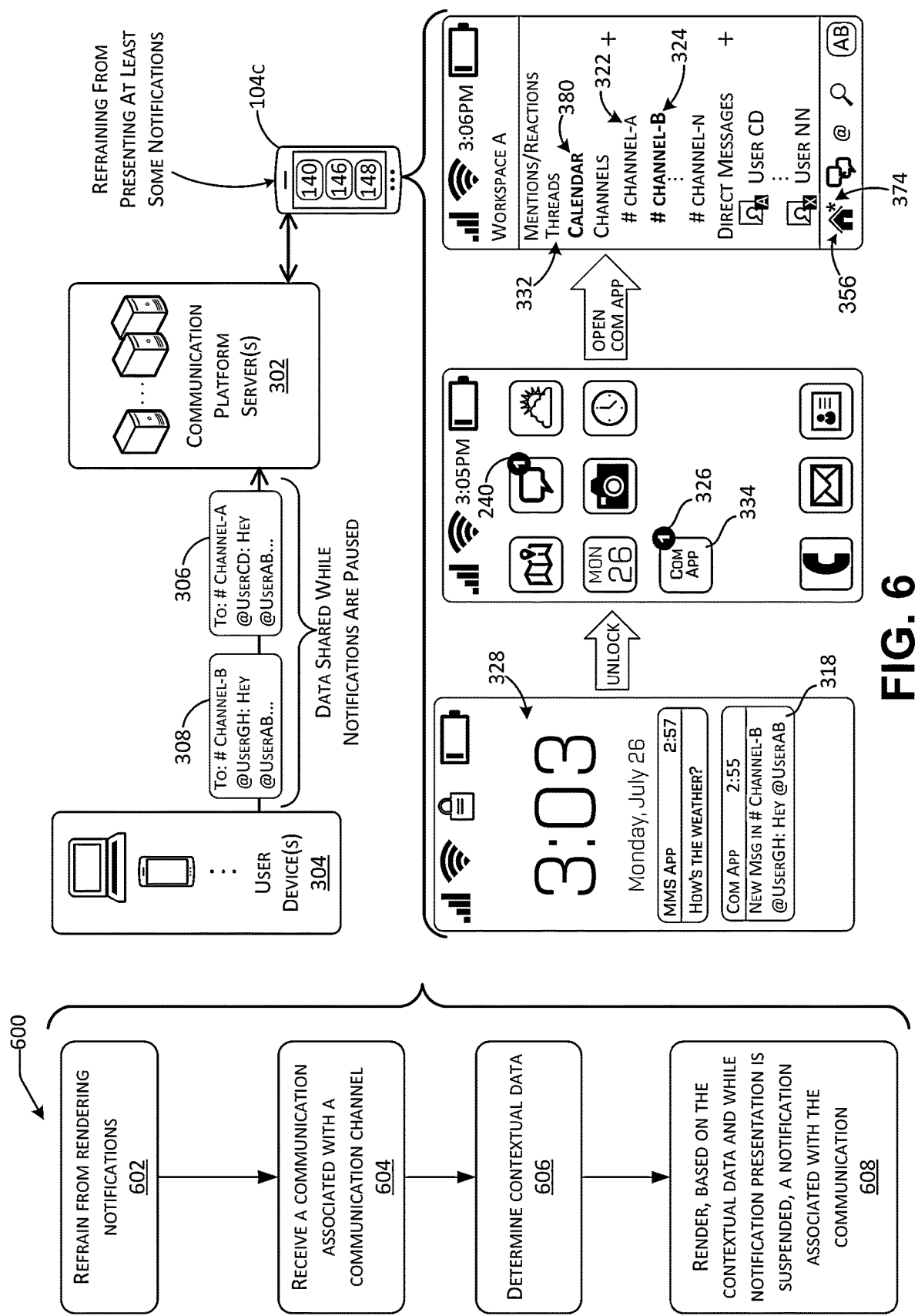
FIG. 6 includes a flow diagram illustrating an example process for managing notification presentation based on contextual data, as described herein.

Referring to FIG. 6, an example process 600 is illustrated for managing presentation of one or more notifications based on a contextual data. For illustration purposes, at least some elements from FIG. 3A are also depicted together with a flow diagram in FIG. 6. In some instances, some or all of process 600 may be performed by one or more components in the environment 100. For example, the process 600 may be performed by the user-status manager 119 (on the server(s) 102), the notifications manager 120 (on the server(s) 102), the user-status manager 146 (on the user computing device 104), the notifications manager 148 (on the user computing device 104), or any combination thereof. By way of example and not limitation, the communication platform referred to in process 600 may be representative of a computing device associated with the (communication platform) server(s) 102, a client referred to in process 600 may be representative of the user computing device(s) 104 and/or application 140. However, the process 600 is not limited to being performed by components in the environment 100.

At operation 602, the process 600 includes refraining, based on one or more of a user status or first contextual data, from rendering one or more notifications for a first client associated with a first user account of a communication platform. The first user account is associated with a communication channel configured to share data between a group of user accounts granted access to the communication channel. For example, one or more of the notification managers 120 or 148 may refrain from presenting, for the communication application 140, a notification associated with the message/data 306. As described above, refraining from presenting notifications may be based on contextual data and/or a user status (e.g., vacation status, notifications schedule, focus mode, pomodoro timer, etc.).

At operation 604, the process 600 includes receiving, from a second client associated with a second user account of the communication platform, a communication associated with the communication channel. For example, the message/data 308 may be received associated with Channel-B. The second user account may be managed by another user or may be an automated account (e.g., bot managed account).

At operation 606, the process 600 includes determining, based on one or more of the communication or the communication channel, contextual data associated with at least one of an activity level of the communication channel or a time-sensitive event indicated in the communication. For example, contextual data that is related to an activity level associated with Channel-B may be determined. In some examples, contextual data that is associated with a time-sensitive event indicated in the message/data 308 may be determined.

At operation 608, the process 600 includes causing a rendering, based on the contextual data and while the first client is refraining from rendering notifications, of a notification indicating the communication associated with the communication channel. For example, based on the contextual data determined in operation 606, one or more notifications may be rendered by the notifications manager 148. As described above, the notifications may include the notification 318 on the lock screen interface 328, the badge 326, the bolded text 380 or 324, and/or the badge 374.

Example Clauses

A: A method comprising: receiving, from a first client associated with a first user account of a communication platform, contextual data associated with at least one of the first client or data exchange between the communication platform and one or more user accounts, wherein the first user account is associated with a communication channel configured to share data between a group of user accounts granted access to the communication channel; determining, based on a threshold, that the contextual data satisfies a condition; receiving, from a second client associated with a second user account of the communication platform, a communication posted in association with the communication channel; and based at least in part on a determination that the contextual data satisfies the condition, refraining from rendering, for display, a notification indicating the communication is posted in association with the communication channel.

B: The method of paragraph A, wherein the contextual data is first contextual data associated with a first time, the method further comprising: receiving second contextual data associated with the at least one of the first client or the data exchange between the communication platform and one or more user accounts at a second time; determining, based on the threshold, that the second contextual data does not satisfy the condition; and causing a rendering, for display, of the notification, based at least in part on a determination that the second contextual data does not satisfy the condition.

C: The method of either paragraph A or B, wherein: the contextual data comprises location data indicating a first physical location of the first client at a first time; the threshold comprises a threshold distance from a second physical location associated with the communication channel; and the condition is satisfied in part based on when the location data equals or exceeds the threshold distance.

D: The method of any one of paragraphs A-C, wherein: the contextual data comprises a rate of data posting occurring via the communication channel; the threshold comprises a threshold data-posting rate; and the condition is satisfied in part based on when the rate of data posting equals or exceeds the threshold data-posting rate.

E: The method of any one of paragraphs A-D, wherein: the contextual data comprises calendar data indicating a range of times associated with non-working hours; and the condition is satisfied at least in part when a time at which the notification would be presented is included in the range of times.

F: The method of any one of paragraphs A-E, wherein the communication is a first communication and the notification is a first notification, the method further comprising: receiving a second communication posted to a second communication channel, the first user account having access to the second communication channel; refraining from rendering a second notification indicating the second communication is posted in association with the second communication channel; ranking, based on one or more criteria, the first communication and the second communication; and causing a rendering, based on the ranking, of the first notification temporally before the second notification.

G: The method of any one of paragraphs A-F, wherein: the contextual data is first contextual data, the communication channel is a first communication channel, and the notification is a first notification; and the method further comprises: receiving, from a second client, a second communication posted to a second communication channel to which the first user account has access, one or more of the second communication or the second communication channel being associated with second contextual data; and causing a rendering, based on the second contextual data, of a second notification via the first client while refraining from rendering the first notification.

H: The method of any one of paragraphs A-G further comprising: receiving, from the first client and via the first user account, a request to post a second communication in association with the communication channel; and delaying, based at least in part on the condition being satisfied, posting the second communication to the communication channel.

I: A system comprising: one or more processors; and one or more non-transitory computer readable media storing instructions that, when executed, cause the system to: receive, from a first client associated with a first user account of a communication platform, contextual data associated with at least one of the first client or data exchange between the communication platform and one or more user accounts, wherein the first user account is associated with a communication channel configured to share data between a group of user accounts granted access to the communication channel; determine, based on a threshold, that the contextual data satisfies a condition; receive, from a second client associated with a second user account of the communication platform, a communication posted in association with the communication channel; and based at least in part on a determination that the contextual data satisfies the condition, refrain from rendering a notification indicating the communication is posted in association with the communication channel.

J: The system of paragraph I, wherein the contextual data is first contextual data associated with a first time, and wherein the instructions further cause the system to: receive second contextual data associated with the at least one of the first client or the data exchange between the communication platform and one or more user accounts at a second time; determine, based on the threshold, that the second contextual data does not satisfy the condition; and cause a rendering, for display, of the notification, based at least in part on a determination that the second contextual data does not satisfy the condition.

K: The system of either paragraph I or J, wherein: the contextual data comprises location data indicating a first physical location of the first client at a first time; the threshold comprises a threshold distance from a second physical location associated with the communication channel; and the condition is satisfied in part based on when the location data equals or exceeds the threshold distance.

L: The system of any one of paragraphs I-K, wherein: the contextual data comprises a rate of data posting occurring via the communication channel; the threshold comprises a threshold data-posting rate; and the condition is satisfied in part based on when the rate of data posting equals or exceeds the threshold data-posting rate.

M: The system of any one of paragraphs I-L, wherein: the contextual data comprises calendar data indicating a range of times associated with non-working hours; and the condition is satisfied at least in part when a time at which the notification would be presented is included in the range of times.

N: The system of any one of paragraphs I-M, wherein the communication is a first communication and the notification is a first notification, and wherein the instructions further cause the system to: receive a second communication posted to a second communication channel, the first user account having access to the second communication channel; refrain from rendering a second notification indicating the second communication is posted in association with the second communication channel; rank, based on one or more criteria, the first communication and the second communication; and cause a rendering, based on the ranking, of the first notification temporally before the second notification.

O: The system of any one of paragraphs I-N, wherein: the contextual data is first contextual data, the communication channel is a first communication channel, and the notification is a first notification; and wherein the instructions further cause the system to: receive, from a second client, a second communication posted to a second communication channel to which the first user account has access, one or more of the second communication or the second communication channel being associated with second contextual data; and cause a rendering, based on the second contextual data, of a second notification via the first client while refraining from rendering the first notification.

P: One or more non-transitory computer readable media storing instructions that, when executed, cause one or more processors to: receive, from a first client associated with a first user account of a communication platform, contextual data associated with at least one of the first client or data exchange between the communication platform and one or more user accounts, wherein the first user account is associated with a communication channel configured to share data between a group of user accounts granted access to the communication channel; determine, based on a threshold, that the contextual data satisfies a condition; receive, from a second client associated with a second user account of the communication platform, a communication posted in association with the communication channel; and based at least in part on a determination that the contextual data satisfies the condition, refrain from rendering a notification indicating the communication is posted in association with the communication channel.

Q: The one or more non-transitory computer readable media of paragraph P, wherein the contextual data is first contextual data associated with a first time, and wherein the instructions further cause the one or more processors to: receive second contextual data associated with the at least one of the first client or the data exchange between the communication platform and one or more user accounts at a second time; determine, based on the threshold, that the second contextual data does not satisfy the condition; and cause a rendering, for display, of the notification, based at least in part on a determination that the second contextual data does not satisfy the condition.

R: The one or more non-transitory computer readable media of either paragraph P or Q, wherein: the contextual data comprises location data indicating a first physical location of the first client at a first time; the threshold comprises a threshold distance from a second physical location associated with the communication channel; and the condition is satisfied in part based on when the location data equals or exceeds the threshold distance.

S: The one or more non-transitory computer readable media of any one of paragraphs P-R, wherein: the contextual data comprises calendar data indicating a range of times associated with non-working hours; and the condition is satisfied at least in part when a time at which the notification would be presented is included in the range of times.

T: The one or more non-transitory computer readable media of any one of paragraphs P-S, wherein: the contextual data is first contextual data, the communication channel is a first communication channel, and the notification is a first notification; and wherein the instructions further cause the one or more processors to: receive, from a second client, a second communication posted to a second communication channel to which the first user account has access, one or more of the second communication or the second communication channel being associated with second contextual data; and cause a rendering, based on the second contextual data, of a second notification via the first client while refraining from rendering the first notification.

U: A method comprising: refraining, based on one or more of a user status or first contextual data, from rendering one or more notifications for a first client associated with a first user account of a communication platform, wherein the first user account is associated with a communication channel configured to share data between a group of user accounts granted access to the communication channel; receiving, from a second client associated with a second user account of the communication platform, a communication associated with the communication channel; determining, based on one or more of the communication or the communication channel, contextual data associated with at least one of an activity level of the communication channel or a time-sensitive event indicated in the communication; and causing a rendering, based on the contextual data and while the first client is refraining from rendering notifications, of a notification indicating the communication associated with the communication channel.

V: A method comprising: receiving, during a suspension period in which a communication application is refraining from presenting notifications, a plurality of items associated with the communication application; associating, based at least in part on contextual data, a subset of the items with an elevated status; and presenting, upon expiration of the suspension period, a notification that, when selected, causes a user computing device to a listing of the subset of items.

W: The method of V, wherein the contextual data includes one or more of a task or a user engagement level with a channel.

X: The method of V, wherein the notification includes one or more of a lock-screen notification including a first link to the listing or a home-screen notification that is associated with a second link to the listing and that is presented on a home screen of the communication application.

Y: The method of V, wherein the suspension period is associated with a non-working state, and wherein the notification is presented based on a transition to a working state.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
identifying a plurality of items associated with a user account of a communication platform, wherein the user account is associated with one or more communication channels;
determining, based on contextual data, that a characteristic of items included in the plurality of items satisfies a condition indicating a heightened importance status for the items;
generating, for the user account, a list comprising the items of the plurality of items, wherein the items are associated with one or more actions to be performed in association with the user account prior to a designated time or during a designated period of time;
excluding, from the list for the user account, other items of the plurality of items that lack the heightened importance status;
determining an order of presentation of the items included in the list based at least in part on the heightened importance status for individual ones of the items; and
presenting a notification that, when selected via user input associated with the user account, causes display of the list with the items presented in the order of presentation.

2. The method of claim 1, wherein the characteristic is a priority status and the condition is satisfied when the characteristic is high priority status or requires an action within a predetermined period of time.

3. The method of claim 1, wherein the items include one or more of a task item, a project, an interactable object, a calendar event, or a message associated with the one or more communication channels.

4. The method of claim 1, wherein the notification is presented at a time corresponding with working hours associated with the user account.

5. The method of claim 1 further comprising:
receiving location data indicating a physical location of a client,
wherein the notification is presented based on a determination that the physical location of the client satisfies a location-based threshold.

6. The method of claim 1, wherein the items are received from a third-party application.

7. The method of claim 1, further comprising:
receiving, in association with the user account, a user preference regarding presentation of the notification;
determining, based at least in part on the user preference, a predetermined notification-presentation schedule associated with the user account; and
presenting a notification at a time corresponding with the predetermined notification-presentation schedule.

8. A system comprising:
one or more processors; and
one or more non-transitory computer readable media storing instructions that, when executed, cause the system to:
identify a plurality of items associated with a user account of a communication platform, wherein the user account is associated with one or more communication channels;
determine, based on contextual data, that a characteristic of items included in the plurality of items satisfies a condition indicating a heightened importance status for the items;
generate, for the user account, a list comprising the items of the plurality of items, wherein the items are associated with one or more actions to be performed in association with the user account prior to a designated time or during a designated period of time;
exclude, from the list for the user account, other items of the plurality of items that lack the heightened importance status;
determine an order of presentation of the items included in the list based at least in part on the heightened importance status for individual ones of the items; and
present a notification that, when selected via user input associated with the user account, causes display of the list with the items presented in the order of presentation.

9. The system of claim 8, wherein the characteristic is a priority status and the condition is satisfied when the characteristic is high priority status or requires an action within a predetermined period of time.

10. The system of claim 8, wherein the items include one or more of a task item, a project, an interactable object, a calendar event, or a message associated with the one or more communication channels.

11. The system of claim 8, wherein the notification is presented at a time corresponding with working hours associated with the user account.

12. The system of claim 8, wherein:
the instructions further cause the system to receive location data indicating a physical location of a client; and
the notification is presented based on a determination that the physical location of the client satisfies a location-based threshold.

13. The system of claim 8, wherein the items are received from a third-party application.

14. The system of claim 8, wherein the instructions further cause the system to:
receive, in association with the user account, a user preference regarding presentation of the notification;
determine, based at least in part on the user preference, a predetermined notification-presentation schedule associated with the user account; and
present a notification at a time corresponding with the predetermined notification-presentation schedule.

15. One or more non-transitory computer readable media storing instructions that, when executed, cause one or more processors to:
identify a plurality of items associated with a user account of a communication platform, wherein the user account is associated with one or more communication channels;
determine, based on contextual data, that a characteristic of items included in the plurality of items satisfies a condition indicating a heightened importance status for the items;
generate, for the user account, a list comprising the items of the plurality of items, wherein the items are associated with one or more actions to be performed in association with the user account prior to a designated time or during a designated period of time;
exclude, from the list for the user account, other items of the plurality of items that lack the heightened importance status;
determine an order of presentation of the items included in the list based at least in part on the heightened importance status for individual ones of the items; and present a notification that, when selected via user input associated with the user account, causes display of the list with the items presented in the order of presentation.

16. The one or more non-transitory computer readable media of claim 15, wherein the characteristic is a priority status and the condition is satisfied when the characteristic is high priority status or requires an action within a predetermined period of time.

17. The one or more non-transitory computer readable media of claim 15, wherein the items include one or more of a task item, a project, an interactable object, a calendar event, or a message associated with the one or more communication channels.

18. The one or more non-transitory computer readable media of claim 15, wherein the notification is presented at a time corresponding with working hours associated with the user account.

19. The one or more non-transitory computer readable media of claim 15, wherein the items are received from a third-party application.

20. The one or more non-transitory computer readable media of claim 15, wherein the instructions further cause the one or more processors to:
- receive, in association with the user account, a user preference regarding presentation of the notification;
- determine, based at least in part on the user preference, a predetermined notification-presentation schedule associated with the user account; and
- present a notification at a time corresponding with the predetermined notification-presentation schedule.

* * * * *